US012096489B2

United States Patent
Wang et al.

(10) Patent No.: US 12,096,489 B2
(45) Date of Patent: Sep. 17, 2024

(54) WIRELESS DEVICE, NETWORK NODE, AND METHODS PERFORMED THEREBY, FOR HANDLING A RANDOM ACCESS PROCEDURE

(71) Applicant: Telefonaktiebolaget LM Ericsson (publ), Stockholm (SE)

(72) Inventors: Min Wang, Luleå (SE); Marco Belleschi, Solna (SE); Jan Christoffersson, Luleå (SE); Mai-Anh Phan, Herzogenrath (DE); Johan Rune, Lidingö (SE); Robert Karlsson, Sundbyberg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 384 days.

(21) Appl. No.: 17/607,469

(22) PCT Filed: Apr. 30, 2020

(86) PCT No.: PCT/SE2020/050439
§ 371 (c)(1),
(2) Date: Oct. 29, 2021

(87) PCT Pub. No.: WO2020/222696
PCT Pub. Date: Nov. 5, 2020

(65) Prior Publication Data
US 2022/0183080 A1 Jun. 9, 2022

Related U.S. Application Data

(60) Provisional application No. 62/841,873, filed on May 2, 2019.

(51) Int. Cl.
*H04W 74/0833* (2024.01)
*H04W 24/08* (2009.01)
(Continued)

(52) U.S. Cl.
CPC ....... *H04W 74/0841* (2013.01); *H04W 24/08* (2013.01); *H04W 72/0446* (2013.01);
(Continued)

(58) Field of Classification Search
CPC ........... H04W 74/006; H04W 74/0833; H04W 74/0841; H04W 74/0866; H04W 16/14
See application file for complete search history.

(56) References Cited

U.S. PATENT DOCUMENTS

2015/0312798 A1* 10/2015 Rune ..................... H04L 1/0072
370/236
2017/0231011 A1    8/2017 Park et al.
(Continued)

FOREIGN PATENT DOCUMENTS

EP       3054737 A1    8/2016
WO   2017136458 A2    8/2017

OTHER PUBLICATIONS

Motorola Mobility, Lenovo; "Modifications to RACH procedure due to LBT" R2-1811416 3GPP TSG RAN WG2 Meeting 103 Gothenburg, Sweden, Aug. 20-24, 2018 Agenda Item: 11.2.1.1 (Year: 2018).*

(Continued)

*Primary Examiner* — Gary Mui
(74) *Attorney, Agent, or Firm* — Weisberg I.P. Law. P.A.

(57) ABSTRACT

A method performed by a wireless device. The method may be understood to be for handling a random access procedure in a wireless communications network via a network node. The wireless device operates in the wireless communications network. The wireless device refrains, after having sent a first message to the network node requesting random access and having received a first random access response message from the network node, from stopping a timer. The timer is for a time window for receiving the random access (Continued)

response message. The wireless device also continues monitoring both: a) a radio channel for further random access response messages from the network node addressed to a temporary identifier, and b) the radio channel, addressed to a temporary identifier specifically addressing the wireless device.

19 Claims, 16 Drawing Sheets

(51) Int. Cl.
  *H04W 72/0446* (2023.01)
  *H04W 74/00* (2009.01)
  *H04W 74/08* (2009.01)

(52) U.S. Cl.
  CPC ..... *H04W 74/006* (2013.01); *H04W 74/0833* (2013.01); *H04W 74/0866* (2013.01)

(56) References Cited

U.S. PATENT DOCUMENTS

| | | | | |
|---|---|---|---|---|
| 2021/0029746 | A1* | 1/2021 | Turtinen | H04W 72/23 |
| 2022/0039016 | A1* | 2/2022 | Terry | H04W 52/0235 |
| 2022/0053558 | A1* | 2/2022 | Zhao | H04W 74/004 |
| 2022/0201522 | A1* | 6/2022 | Tao | H04W 74/0841 |

OTHER PUBLICATIONS

MediaTek Inc. "Extended ra-ResponseWindow and RA-RNTI calculation" R2-1901093 3GPP TSG-RAN WG2 Meeting #105 Athens, Greece, Feb. 25-Mar. 1, 2019 Agenda Item: 11.2.1.1 (Year: 2019).*
Motorola Mobility, Lenovo; "Modifications to RACH procedure due to LBT" R2-1901211 3GPP TSG RAN WG2 Meeting 105 Athens, Greece, Feb. 25-Mar. 1, 2019 Agenda Item: 11.2.1.1 (Year: 2019).*
Ericsson; "RA-RNTI to handle longer RAR window for NR-U" R2-1901677 3GPP TSG-RAN WG2 #105 Athens, Greece, Feb. 25-Mar. 1, 2019 Agenda Item: 11.2.1.1 (Year: 2019).*
Xiaomi Communications; "Consideration on extending RAR window size" R2-1901907 3GPP TSG-RAN2 #105 Athens, Greece, Feb. 25-Mar. 1, 2019 Agenda Item: 11.2.1.1 (Year: 2019).*
ZTE Corporation, Sanechips "Considerations on RAR window expansion for NR-U" R2-1903538 3GPP TSG RAN WG2 NR #105bis Meeting Xi'an, China, Apr. 8-Apr. 12, 2019 Agenda Item: 11.2.1.1 (Year: 2019).*
Xiaomi Communications; "Consideration on extending RAR window size" R2-1903671 3GPP TSG-RAN2 #105bis Xi'an, China, Apr. 8-12, 2019 Agenda Item: 11.2.1.1 (Year: 2019).*
Ericsson; "RA-RNTI to handle longer RAR window for NR-U" R2-1904750 3GPP TSG-RAN WG2 #105bis Xi'an, China, Apr. 8-Apr. 12, 2019 Agenda Item: 11.2.1.1 (Year: 2019).*
International Search Report and Written Opinion dated Nov. 20, 2020 for International Application No. PCT/SE2020/050439 filed Apr. 30, 2020, consisting of 14 pages.
3GPP TSG RAN WG2 Meeting 105bis R2-1904132; Title: Modifications to RACH procedure due to LBT; Agenda Item: 11.2.1.1; Source: Motorola Mobility, Lenovo; Document for: Discussion, Decision; Date and Location: Apr. 8-12, 2019, Xi'an, China; consisting of 4 pages.
3GPP TR 38.889 V16.0.0; 3rd Generation Partnership Project; Technical Specification Group Radio Access Network; Study on NR-based access to unlicensed spectrum (Release 16), Dec. 2018, consisting of 119 pages.
3GPP TS 38.213 V15.4.0; 3rd Generation Partnership Project; Technical Specification Group Radio Access Network; NR; Physical layer procedures for control (Release 15), Dec. 2018, consisting of 104 pages.
3GPP TS 38.321 V15.4.0; 3rd Generation Partnership Project; Technical Specification Group Radio Access Network; NR; Medium Access Control (MAC) protocol specification (Release 15), Dec. 2018, consisting of 77 pages.
European Supplementary Search Report dated May 23, 2022 for European Application No. EP20799350; consisting of 4 pages.

* cited by examiner a)

b)

a)

b)

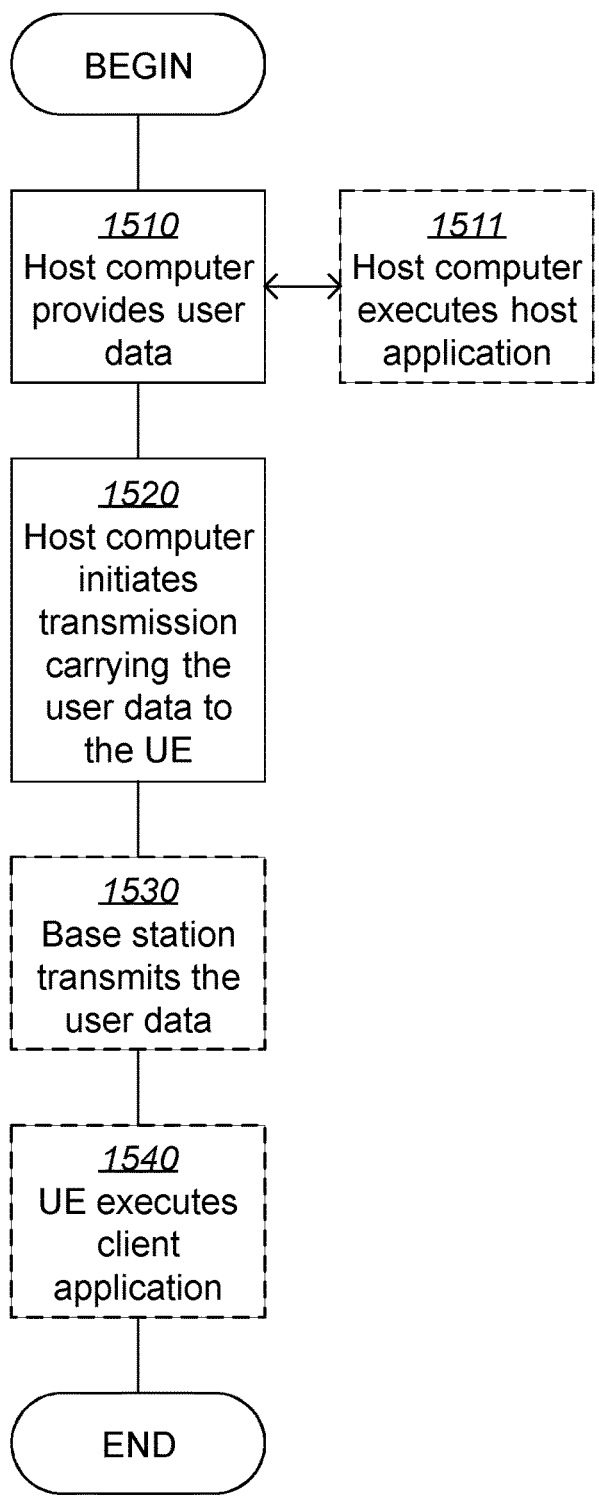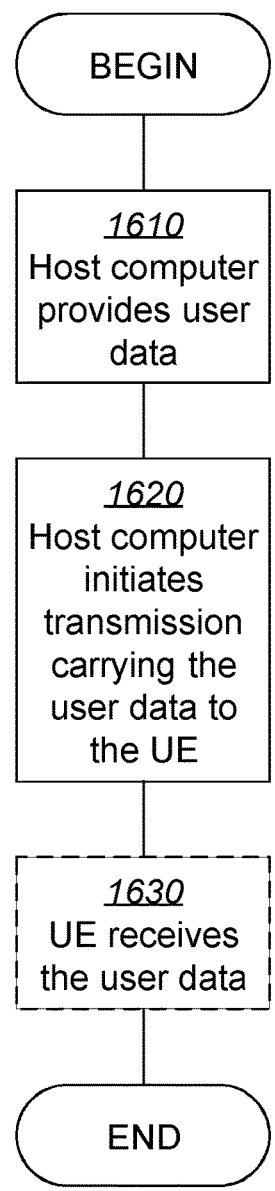
FIG. 15
FIG. 16

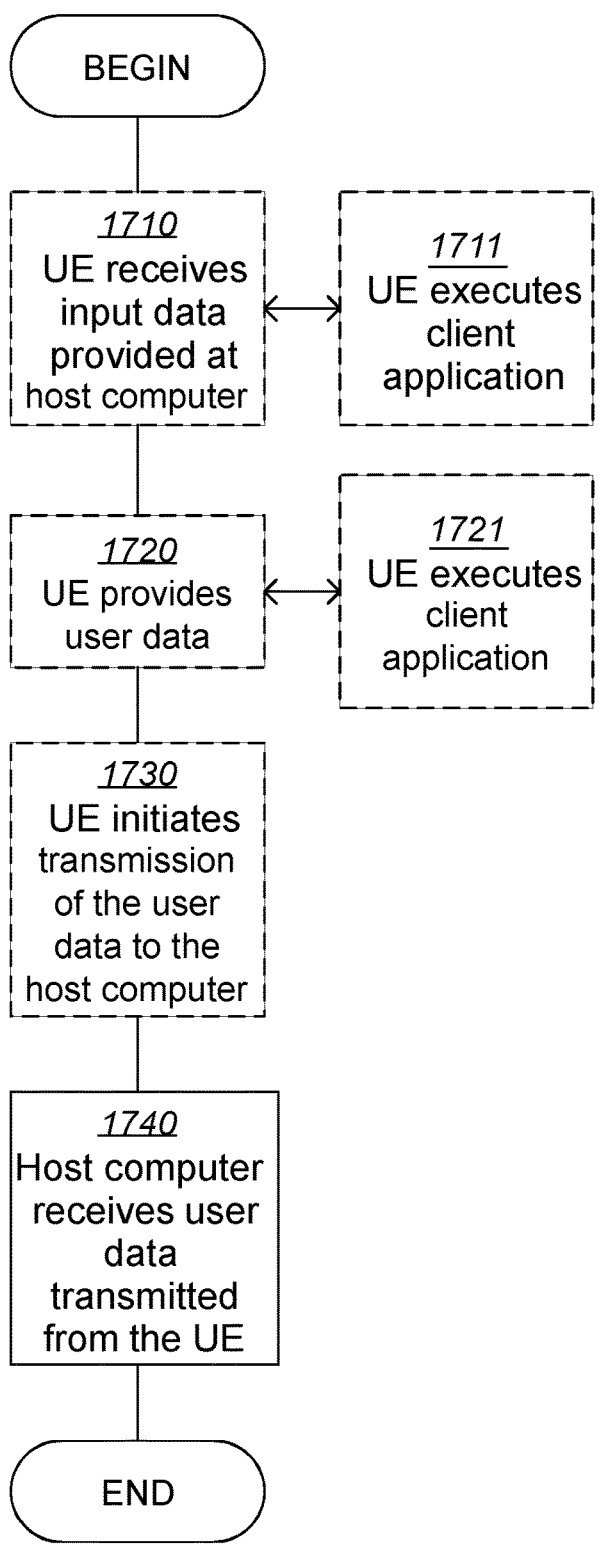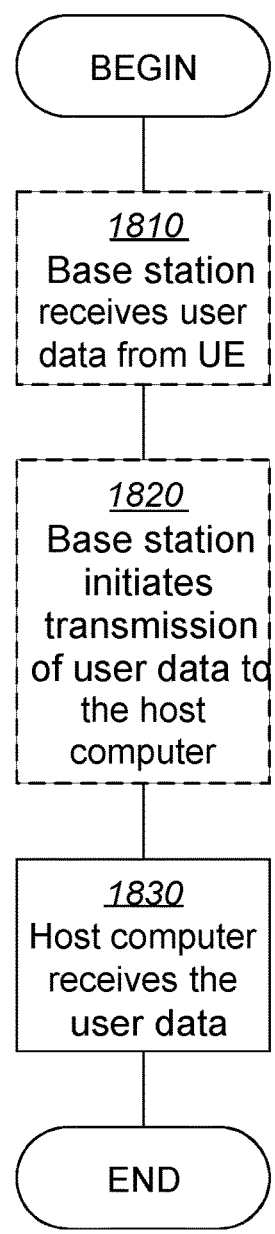
FIG. 17
FIG. 18

WIRELESS DEVICE, NETWORK NODE, AND METHODS PERFORMED THEREBY, FOR HANDLING A RANDOM ACCESS PROCEDURE

CROSS-REFERENCE TO RELATED APPLICATIONS

This application is a Submission Under 35 U.S.C. § 371 for U.S. National Stage Patent Application of International Application No.: PCT/SE2020/050439, filed Apr. 30, 2020 entitled "WIRELESS DEVICE, NETWORK NODE, AND METHODS PERFORMED THEREBY, FOR HANDLING A RANDOM ACCESS PROCEDURE," which claims priority to U.S. Provisional Application No. 62/841,873, filed May 2, 2019, the entireties of both of which are incorporated herein by reference.

TECHNICAL FIELD

The present disclosure relates generally to a wireless device and methods performed thereby for handling a random access procedure in a wireless communications network via a network node. The present disclosure also relates generally to a network node, and methods performed thereby for handling a random access procedure by a wireless device in a wireless communications network.

BACKGROUND

Wireless devices within a wireless communications network may be e.g., User Equipments (UE), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone and/or between a wireless device and a server via a Radio Access Network (RAN) and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a network node, which may be an access node such as a radio network node, radio node or a base station, e.g., a Radio Base Station (RBS), which sometimes may be referred to as e.g., gNB, evolved Node B ("eNB"), "eNodeB", "NodeB", "B node", Transmission Point (TP), or BTS (Base Transceiver Station), depending on the technology and terminology used. The base stations may be of different classes such as e.g., Wide Area Base Stations, Medium Range Base Stations, Local Area Base Stations, Home Base Stations, pico base stations, etc. . . . , based on transmission power and thereby also cell size. A cell is the geographical area where radio coverage is provided by the base station or radio node at a base station site, or radio node site, respectively. One base station, situated on the base station site, may serve one or several cells. Further, each base station may support one or several communication technologies. The base stations communicate over the air interface operating on radio frequencies with the terminals within range of the base stations. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

Next generation systems are expected to support a wide range of use cases with varying requirements ranging from fully mobile devices to stationary Internet of Things (IoT) or fixed wireless broadband devices. The traffic pattern associated with many use cases may be expected to consist of short or long bursts of data traffic with varying length of waiting period in between, here called inactive state.
NR The so-called 5G system, from a radio perspective started to be standardized in 3GPP, and the so-called New Radio (NR) is the name for the radio interface. One of the characteristics of NR is that the frequency range goes to higher frequencies than LTE, e.g., above 6 GHz, where it is known to have more challenging propagation conditions, such as a higher penetration loss. To mitigate some of these effects, multi-antenna technologies such as beamforming may be massively used. Yet another NR characteristic is the use of multiple numerologies in DL and UL in a cell, or for a UE, and/or in different frequency bands. Yet another characteristic is the possibility to enable shorter latencies. NR architecture is being discussed in 3GPP. In the current concept, gNB denotes an NR BS. One NR BS may correspond to one or more transmission/reception points.

In NR, both license assisted access and standalone operation in unlicensed spectrum (NR-U) are expected to be supported in 3GPP. Hence, the procedure of Physical Random Access Channel (PRACH) transmission and/or scheduling request (SR) transmission in unlicensed spectrum may need to be investigated in 3GPP.

With network operation in unlicensed spectrum follows a number of restrictions. One of them is that a device, e.g., a radio network node or a mobile terminal, may need to monitor the shared medium, that is, the channel, and determine that it is free, namely, not being used by any other device, before starting to transmit on the channel. This procedure may be referred to as Listen-Before-Talk (LBT) or Clear Channel Assessment (CCA).

In the following, NR-U and the channel access procedure for an unlicensed channel based on LBT is introduced.
NR-U Introduction In order to tackle the ever-increasing data demand, NR is considered for both licensed and unlicensed spectrum. The standardization work for licensed spectrum in Rel-15 was finalized, and the study item on NR-based Access to Unlicensed Spectrum was finalized in 2018. The corresponding work item was approved at RP-82 in December 2018, and compared to LTE License Assisted Access (LAA), NR-U may be understood to also need to support dual connectivity (DC) and standalone scenarios, where the MAC procedures including Random Access CHannel (RACH) and scheduling procedure on unlicensed spectrum may be subject to LBT and thus potential LBT failures. In LTE LAA, there may be understood to be no such issues since the RACH and scheduling related signalling may be transmitted on the Primary Cell (PCell) in licensed spectrum instead of unlicensed spectrum.

For discovery reference signal (DRS) transmission such as Primary Synchronization Signal (PSS)/Secondary Synchronization Signal (SSS), Physical Broadcast Channel (PBCH), Channel State Information Reference Signal (CSI-RS), control channel transmission such as Physical Uplink Control CHannel (PUCCH)/Physical Downlink Control CHannel (PDCCH), physical data channel such as Physical Uplink Shared CHannel (PUSCH)/Physical Downlink Shared CHannel (PDSCH), and uplink sounding reference signal such as SRS transmission, channel sensing may need to be applied to determine the channel availability before the physical signal may be transmitted using the channel.

The Radio Resource Management (RRM) procedures in NR-U may be generally rather similar to those in LAA, since NR-U is aiming to reuse LAA/enhanced LAA (eLAA)/further enhanced LAA (feLAA) technologies as much as possible to handle the coexistence between NR-U and other legacy Radio Access Technologies (RATs). RRM measurements and report may be understood to comprise special configuration procedure with respect to the channel sensing and channel availability.

Hence, channel access/selection for LAA was one of the important aspects for co-existence with other RATs such as Wi-Fi. For instance, LAA has aimed to use carriers that are congested with Wi-Fi.

Channel Access Procedure in NR-U

Listen-before-talk (LBT) may be understood to be designed for unlicensed spectrum co-existence with other RATs. In this mechanism, a radio device may apply a Clear Channel Assessment (CCA) check, that is, channel sensing, before any transmission. The transmitter may involve Energy Detection (ED) over a time period compared to a certain energy detection threshold, also referred to as ED threshold, in order to determine if a channel is idle. In case the channel is determined to be occupied, the transmitter may perform a random back-off within a contention window before the next CCA attempt. In order to protect the ACKnowledgment (ACK) transmissions, the transmitter may need to defer a period after each busy CCA slot prior to resuming back-off. As soon as the transmitter may have grasped access to a channel, the transmitter may only be allowed to perform transmission up to a maximum time duration, namely, the Maximum Channel Occupancy Time (MCOT). For Quality of Service (QoS) differentiation, a channel access priority based on the service type has been defined. For example, four LBT priority classes may be defined for differentiation of channel access priorities between services using different contention window sizes (CWS) and MCOT durations.

As described in 3GPP TR 38.889, v 16.0.0, the channel access schemes for NR-based access for unlicensed spectrum may be classified into the following categories:

Cat-1: involves immediate transmission after a short switching gap. This may be used for a transmitter to immediately transmit after an Uplink/Downlink (UL/DL) switching gap inside a COT. The switching gap from reception to transmission may be understood to be to accommodate the transceiver turnaround time and is no longer than 16 µs.

Cat-2: involves LBT without random back-off. The duration of time that the channel is sensed to be idle before the transmitting entity transmits is deterministic.

Cat-3: involves LBT with random back-off with a contention window of fixed size. The LBT procedure may have the following procedure as one of its components. The transmitting entity may draw a random number N within a contention window. The size of the contention window may be specified by the minimum and maximum value of N. The size of the contention window is fixed. The random number N may be used in the LBT procedure to determine the duration of time that the channel is sensed to be idle before the transmitting entity transmits on the channel.

Cat-4: involves LBT with random back-off with a contention window of variable size. The LBT procedure may have the following as one of its components. The transmitting entity may draw a random number N within a contention window. The size of contention window may be specified by the minimum and maximum value of N. The transmitting entity may vary the size of the contention window when drawing the random number N. The random number N may be used in the LBT procedure to determine the duration of time that the channel is sensed to be idle before the transmitting entity transmits on the channel.

For different transmissions in a COT and different channels/signals to be transmitted, different categories of channel access schemes may be used.

RACH Procedures in NR Unlicensed Spectrum

The ordinary four-step Random Access (RA) has been the current standard for legacy systems such as LTE and NR Rel-15. It has been proposed to study a two-step procedure where the UL messages, that is, PRACH+Msg3, may be sent simultaneously and, similarly, the two DL messages, e.g., time advance command in Random Access Response (RAR) and contention resolution information, may be sent as a simultaneous response in the DL. In the legacy four step procedure, one major purpose of the first two messages may be understood to be to obtain UL time alignment for the UE. In many situations, e.g., in small cells or for stationary UEs, this may not be needed since either a Timing alignment (TA)=0 may be sufficient, e.g., in small cells or a stored TA value from the last RA may serve also for the current RA, e.g., for stationary UE. In future radio networks, it may be expected that these situations are common, both due to dense deployments of small cells and a great number of e.g., stationary IoT devices. A possibility to skip the message exchange in cases where there may be no need to obtain the TA value may be lead to reduced RA latency and may be beneficial in several use cases, for example when transmitting infrequent small data packets. On the other hand, the two step RA may be understood to consume more resources since it may use contention-based transmission of the data. This may be understood to mean that the resources that may be configured for the data transmission may often be unused.

If both the 4-step and 2-step Random Access (RA) are configured in a cell, and for the UE, the UE may choose its preamble from one specific set if it wants to do a 4-step RA, and from another set if it wants to do a 2-step RA. Hence, a preamble partition may be done to distinguish between 4-step and 2-step RA. Alternatively, the PRACH configurations may be different for the 2-step and 4-step RA procedure, in which case it may be deduced from where the preamble transmission is done if the UE is doing a 2-step or 4-step procedure.

Legacy 4-Step Random Access

The legacy 4-step RA has been used in LTE and is also proposed as baseline for NR. The principle of this procedure is shown in FIG. 1, which is a schematic illustration of the 4-Step RACH procedure. Step 1 involves the preamble transmission. In this step, the UE may randomly selects a RA preamble (PREAMBLE_INDEX) which may then be transmitted by the UE. When the eNB detects the preamble, it may estimate the Timing alignment (TA) the UE may need to use in order to obtain UL synchronization at the eNB. Step 2 involves the RA response (RAR). In this step, the eNB may send a RA response (RAR) including the TA, the temporary Cell Radio Network Temporary Identifier (TC-RNTI) to be used by the UE, a Random Access Preamble identifier that may match the transmitted PREAMBLE_INDEX and a grant for Msg3. The UE may expect the RAR and thus, may monitors PDCCH addressed to the Random Access-Radio Network Temporary Identifier (RA-RNTI) to receive the RAR message from the eNB until the configured RAR window (ra-Response Window) has expired or until the RAR has been successfully received. From 3GPP TS 38.321, v. 15.4.0: "The MAC entity may stop ra-Response Window (and hence monitoring for Random Access Response(s)) after successful reception of a Random Access Response containing Random Access Preamble identifier that matches the transmitted PREAMBLE_INDEX." Step 3 involves "Msg3", which may be understood to comprise the UE ID or UE-specific C-RNTI. In Msg3, the UE may transmit its identifier (UE ID) for initial access or—if it is already in RRC_CONNECTED or RRC_INACTIVE mode and may need to e.g., resync, its UE-specific RNTI. If the gNB cannot decode Msg3 at the granted UL resources, it may send a Downlink Control Information (DCI) addressed to TC-RNTI for retransmission of Msg3. Hybrid Automatic Repeat reQuest (HARQ) retransmission may be requested until the UEs may restart the random access procedure from Step 1 after reaching the maximum number of HARQ retransmissions or until Msg3 can be successfully received by the gNB. Step 4 involves "Msg4", which may be understood as contention resolution. In Msg4, the eNB may respond by acknowledging the UE ID or Cell Radio Network Temporary Identifier (C-RNTI). The Msg4 may give contention resolution, that is, only one UE ID or C-RNTI may be sent even if several UEs have used the same preamble, and the same grant for Msg3 transmission, simultaneously.

For Msg4 reception, the UE may monitor TC-RNTI, if it transmitted its UE ID in Msg3, or C-RNTI, if it transmitted its C-RNTI in Msg3.

In LTE, the 4-step RA cannot be completed in less than 14 ms/Transmission Time Interval (TTI)/SubFrame (SF).

2-Step Random Access

The 2-step RA may be understood to give a much shorter latency than the ordinary 4-step RA. In the 2 step RA, the preamble and a message corresponding to Msg3 in the 4-step RA may be transmitted in the same or in two subsequent subframes. The Msg3 may be sent on a resource dedicated to the specific preamble. This may be understood to mean that both the preamble and the Msg3 may face contention, but contention resolution in this case may be understood to mean that either both preamble and Msg3 may be sent without collision or both may collide. The 2-step RA procedure is depicted as a schematic illustration in FIG. 2. At 21, upon successful reception of the preamble and Msg3, which as depicted, may be understood to be transmitted in the same SF, the eNB may respond with a TA at 22, which by assumption should not be needed or may just give very minor updates, and a Msg4 for contention resolution.

An issue that may occur if the UE TA is bad, e.g., using TA=0 in a large cell or using an old TA even though the UE has moved, is that only the preamble may be detected by the eNB because a transmission with an inaccurate TA value may interfere with transmissions from other UEs in the same cell. Additionally, the preamble signal may be understood to have a higher detection probability than the normal data due to its design pattern. In this case, the network (NW) may reply with an ordinary RAR giving the UE an opportunity to transmit an ordinary Msg3 on a scheduled resource. This may be understood to be a fallback to 4-step RA.

Existing methods to handle a random access procedure in wireless communications networks may lead to failures by either the UE or the eNB to receive any of the exchanged messages, which may lead to increased latency.

SUMMARY

It is an object of embodiments herein to improve the handling of a random access procedure in a wireless communications network via a network node.

According to a first aspect of embodiments herein, the object is achieved by a method, performed by a wireless device. The method is for handling a random access procedure in a wireless communications network via a network node. The wireless device operates in the wireless communications network. The wireless device refrains, after having sent a first message to the network node requesting random access and having received a first random access response message from the network node, from stopping a timer. The timer is for a time window for receiving the random access response message. The wireless device also continues monitoring both: a) a radio channel for further random access response messages from the network node addressed to a temporary identifier, and b) the radio channel, addressed to a temporary identifier specifically addressing the wireless device.

According to a second aspect of embodiments herein, the object is achieved by a method, performed by a network node. The method is for handling the random access procedure by the wireless device in the wireless communications network via the network node. The network node operates in the wireless communications network. The network node receives, from the wireless device, the first message requesting random access. After having sent one or more random access response messages to the wireless device, and in absence of having received a third message in response from the wireless device during at least one time period wherein reception is expected, the network node sends, to the wireless device, at least one of: i) one or more second random access response messages, as long as a time window for sending a random access response message to the wireless device has not expired, and ii) downlink control information indicating retransmission of the third message.

According to a third aspect of embodiments herein, the object is achieved by the wireless device, for handling the random access procedure in the wireless communications network via the network node. The wireless device is configured to operate in the wireless communications network. The wireless device is further configured to refrain, after having sent the first message to the network node configured to request random access and having received the first random access response message from the network node, from stopping the timer. The timer is configured to be for a time window for receiving the random access response message. The wireless device is also configured to continue monitoring both: a) the radio channel for further random access response messages from the network node addressed to the temporary identifier, and b) the radio channel, addressed to the temporary identifier configured to specifically address the wireless device.

According to a fourth aspect of embodiments herein, the object is achieved by the network node, for handling the random access procedure by the wireless device in the wireless communications network via the network node. The network node is configured to operate in the wireless communications network. The network node is further configured to receive, from the wireless device, the first message requesting random access. After having sent the one or more random access response messages to the wireless device, and in absence of having received a third message in response from the wireless device during at least one time period wherein reception is configured to be expected, the network node is further configured to send, to the wireless device, at least one of: i) the one or more second random access response messages, as long as the time window for sending the random access response message to the wireless device has not expired, and ii) the downlink control information indicating retransmission of the third message.

By the wireless device refraining from stopping the timer and continuing to monitor both: a) the radio channel for further random access response messages addressed to the temporary identifier, and b) the radio channel, addressed to the temporary identifier specifically addressing the wireless device, the wireless device enables to reduce the probability of a reception failure occurring. This is because the wireless device may be enabled to continue the random access procedure keeping all possible options open and running, at the same time. That is, the wireless device may, on the one hand, continue the random access procedure assuming the network node may retransmit the random access response message, and monitor the PDCCH addressed to e.g., the RA-RNTI. At the same time the wireless device may, on the other hand, continue the random access procedure assuming the network node may send a grant for retransmission of the third message that may be subsequently sent by the wireless device, and while the timer is running, also start to monitor PDCCH addressed to, e.g., TC-RNTI. By doing so, the wireless device may then be ready to continue the random access procedure based on the action the network node may take next, without jeopardizing creating a radio link failure, keeping all potential outcomes open and ready to be continued without having to switch to the initial phase, that is, without having to re-initiate the random access procedure, after expiration of the timer, which would in turn increase the latency for RA access. Hence, thanks to the performance of embodiments herein, the random access latency may be reduced, and unnecessary transmissions may be minimized.

By the network node, after having sent the one or more random access response messages, and in the absence of having received the third message in response, sending the at least one of one or more second random access response messages, that is, one or more additional or further second random access response messages, and the downlink control information indicating retransmission of the third message, the network node enables to reduce the probability of a communication failure occurring. This is because the network node may increase the chances that the wireless device either receives the at least one of one or more random access response messages, or the downlink control information indicating that the network node did not receive the third message, if the wireless device had sent it, and the network node may initiate a grant to the wireless device for retransmission of the third message. By doing so, the wireless device may then be ready to continue the random access procedure without having to switch to the initial phase, that is, without having to re-initiate the random access procedure, after expiration of the timer, which would in turn increase the latency for RA access. Hence, thanks to the performance of embodiments herein, the random access latency may be reduced, and unnecessary transmissions may be minimized.

BRIEF DESCRIPTION OF THE DRAWINGS

Examples of embodiments herein are described in more detail with reference to the accompanying drawings, according to the following description.

FIG. 15 is a flowchart depicting embodiments of a method in a communications system including a host computer, a base station and a user equipment, according to embodiments herein.

FIG. 16 is a flowchart depicting embodiments of a method in a communications system including a host computer, a base station and a user equipment, according to embodiments herein.

FIG. 17 is a flowchart depicting embodiments of a method in a communications system including a host computer, a base station and a user equipment, according to embodiments herein.

FIG. 18 is a flowchart depicting embodiments of a method in a communications system including a host computer, a base station and a user equipment, according to embodiments herein.

DETAILED DESCRIPTION

Figure 1:
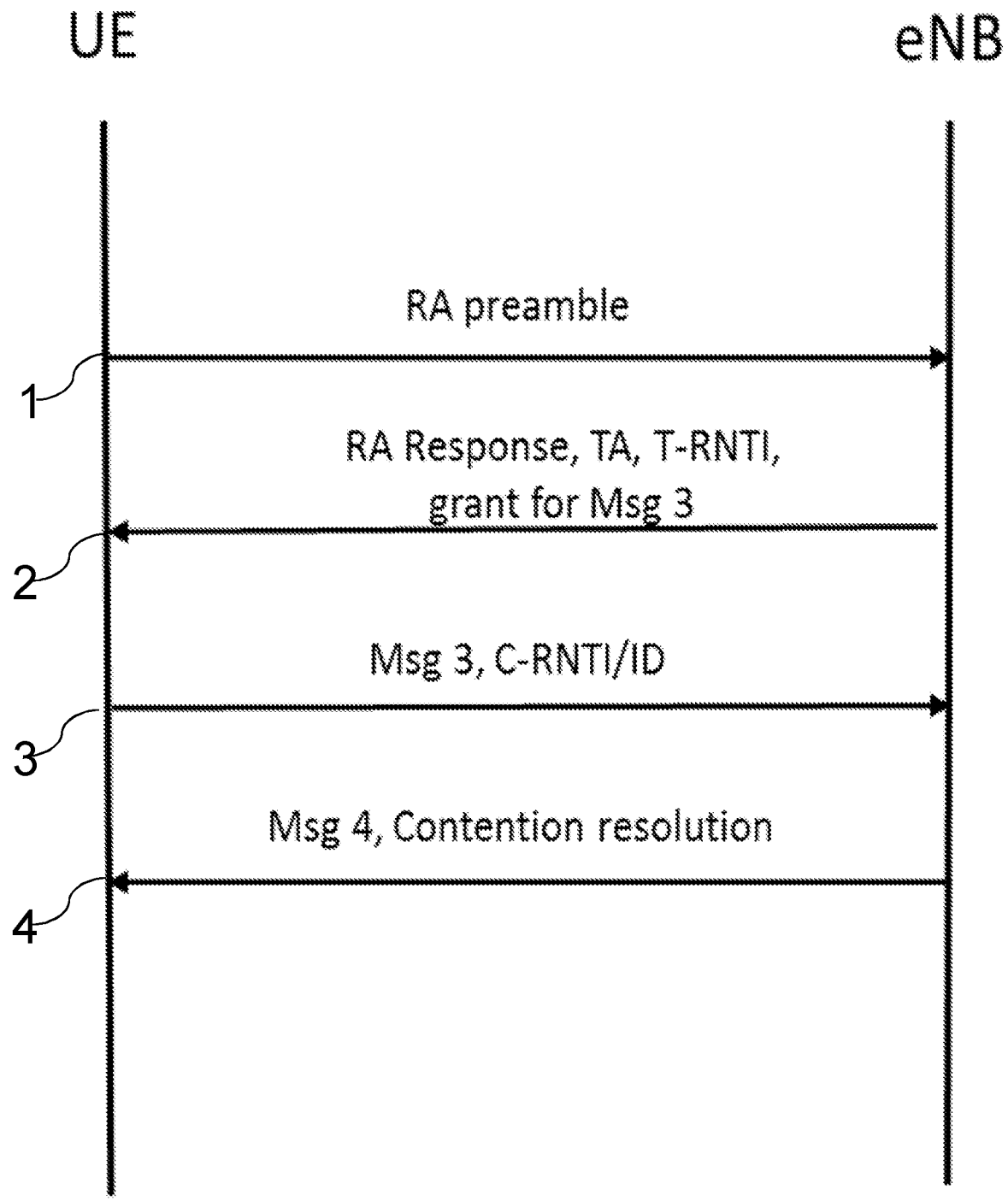
FIG. 1 is a schematic block diagram illustrating a 4-Step RACH procedure.
Figure 2:
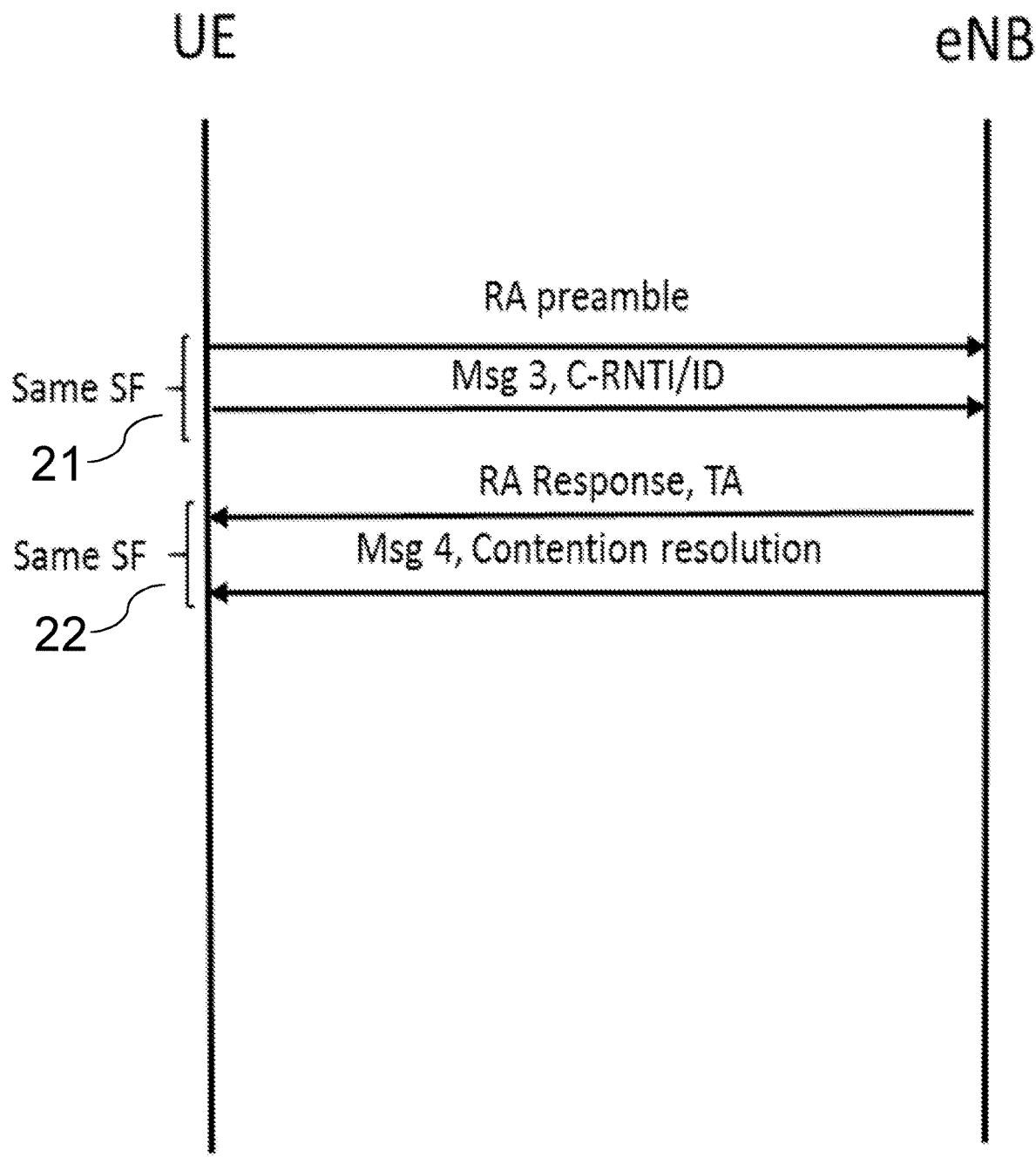
FIG. 2 is a schematic block diagram illustrating a 2-step RA.

As part of the development of embodiments herein, one or more challenges with the existing technology will first be identified and discussed.

In a 4-step RA procedure, LBT operation may be typically required for every RA message. In this case, Msg3 transmission may be blocked by LBT failures. As a result, the gNB will not receive the transmission of Msg3. Therefore, when the gNB has transmitted a RAR but not received a Msg3 transmission, it will not be able to deduce which error case has occurred at the UE: 1) the UE failed to receive the RAR; 2) the UE successfully received the RAR, but failed LBT in the Msg3 transmission attempt; or 3) after successful reception of a RAR and successful LBT, the UE transmitted the Msg3, but the gNB failed to receive it.

As a result, this will create an ambiguity concerning RA transmission status between the UE and the gNB. Therefore, the gNB may take an action which is not expected at the UE side.

While in the existing MAC specification, the UE MAC entity may stop the ra-ResponseWindow, and hence monitoring for Random Access Response(s) after successful reception of a Random Access Response containing a Random Access Preamble identifier that matches the transmitted PREAMBLE_INDEX, such UE behaviors are not helpful to solve the ambiguity in an unlicensed spectrum.

In one example, the gNB may retransmit the RAR message, while the UE monitors only PDCCH addressed to TC-RNTI expecting to receive a grant for retransmission of Msg3, if the UE MAC has chosen to stop its ra-ResponseWindow after successful reception of a Random Access Response containing a Random Access Preamble identifier that matches the transmitted PREAMBLE_INDEX.

In another example, the gNB may send a new DCI addressed to TC-RNTI for retransmission of Msg3, while the UE may still be monitoring for PDCCH addressed to RA-RNTI for reception of the RAR message within the RAR window, such may occur since the gNB is not aware of that the UE has failed to receive the RAR.

In both examples, a reception failure may occur so that the UE has to switch to the initial phase, that is, re-initiating the random access procedure, after expiration of the timers, which may increase the latency for RA access.

Certain aspects of the present disclosure and their embodiments may provide solutions to these or other challenges. Embodiments herein may be generally understood to relate to an improved UE monitoring to mitigate RA transmission ambiguity.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although the below embodiments are described in the context of NR unlicensed spectrum (NR-U), to exemplify the embodiments herein, this should not be seen as limiting the scope of the embodiments herein to only the aforementioned system. Embodiments herein are not limited to NR-U scenarios. They are also applicable to other unlicensed operation scenarios such as LTE LAA/eLAA/feLAA/MulteFire. They are also applicable to licensed operation scenarios such as NR. Other wireless systems with similar features, may also benefit from exploiting the ideas covered within this disclosure.

Figure 3:
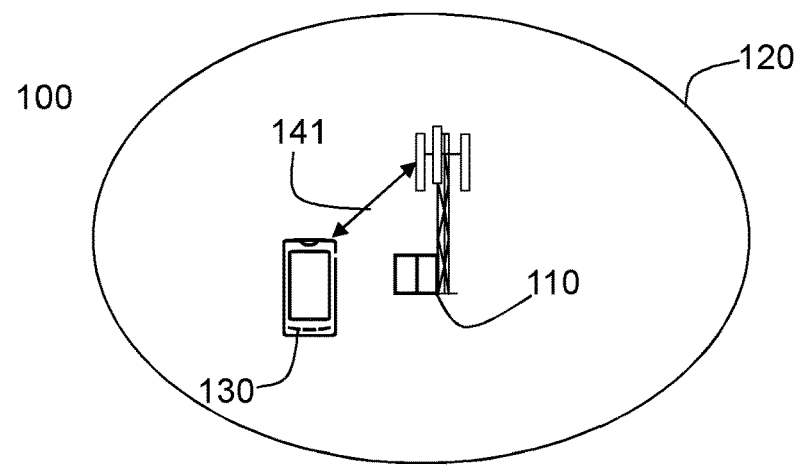
FIG. 3 is a schematic diagram an example of a wireless communications network, according to embodiments herein.
Figure 3:
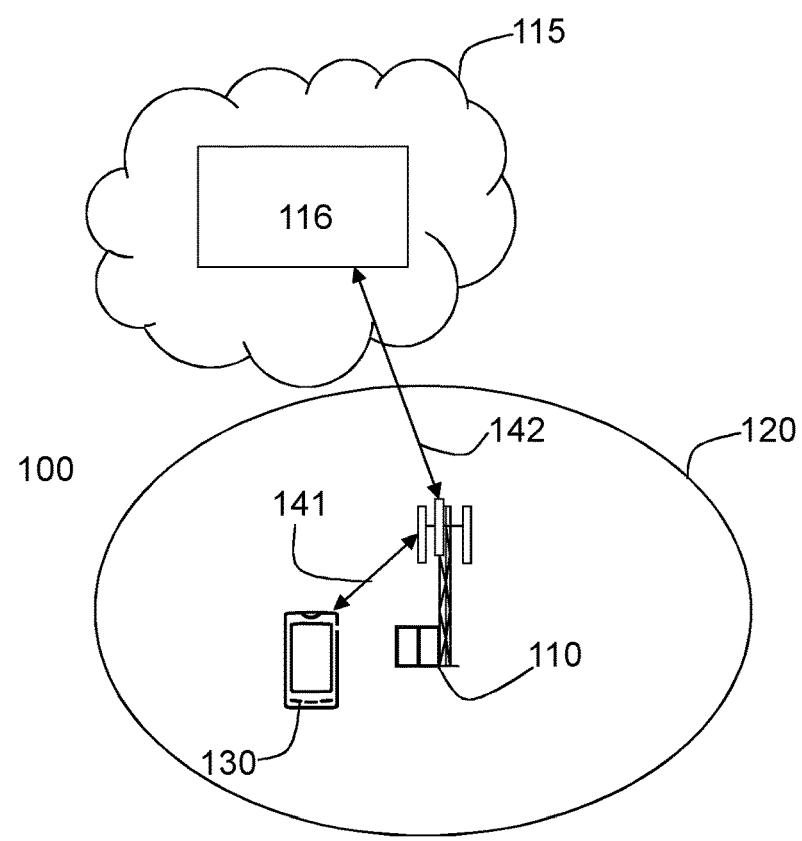

FIG. 3 depicts two non-limiting examples of a wireless network or wireless communications network 100, sometimes also referred to as a wireless communications system, cellular radio system, or cellular network, in which embodiments herein may be implemented. The wireless communications network 100 may typically be a 5G system, 5G network, or Next Gen System or network. In particular examples, the wireless communications network 100 may support NR operating in unlicensed spectrum (NR-U). In other examples, the wireless communications network 100 may support NR operating in licensed spectrum. In other examples, the wireless communications network 100 may instead, or in addition, support other technologies such as, for example, Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, such as LTE LAA, eLAA, feLAA and/or MulteFire. Yet in other examples, the wireless communications network 100 may support other technologies such as, for example Wideband Code Division Multiple Access (WCDMA), Universal Terrestrial Radio Access (UTRA) TDD, Global System for Mobile communications (GSM) network, GSM/Enhanced Data Rates for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR and LTE may be used in this disclosure to exemplify embodiments herein, this should not be seen as limiting the scope of the embodiments herein to only the aforementioned system.

The wireless communications network 100 comprises a plurality of network nodes, whereof a network node 110 is depicted in the non-limiting example of FIG. 3. The network node 110 is a radio network node. That is, a transmission point such as a radio base station, for example a gNB, an eNB, an eNodeB, or a Home Node B, a Home eNode B, or any other network node with similar features capable of serving a user equipment, such as a wireless device or a machine type communication device, in the wireless communications network 100. In some examples, such as that depicted in FIG. 3b, the network node 110 may be a distributed node, and may partially perform its functions in collaboration with a virtual node 116 in a cloud 115.

The wireless communications network 100 may cover a geographical area, which in some embodiments may be divided into cell areas, wherein each cell area may be served by a radio network node, although, one radio network node may serve one or several cells. In the example of FIG. 3, the network node 110 serves a cell 120. The network node 110 may be of different classes, such as, e.g., macro eNodeB, home eNodeB or pico base station, based on transmission power and thereby also cell size. In some examples, the network node 110 may serve receiving nodes with serving beams. The radio network node may support one or several communication technologies, and its name may depend on the technology and terminology used. Any of the radio network nodes that may be comprised in the communications network 100 may be directly connected to one or more core networks.

A plurality of wireless devices may be located in the wireless communication network 100, whereof a wireless device 130 is depicted in the non-limiting example of FIG. 3. The wireless device 130 comprised in the wireless communications network 100 may be a wireless communication device such as a 5G UE, or a UE, which may also be known as e.g., mobile terminal, wireless terminal and/or mobile station, a mobile telephone, cellular telephone, or laptop with wireless capability, just to mention some further examples. Any of the user equipments comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) device, device equipped with a wireless interface, such as a printer or a file storage device, modem, or any other radio network unit capable of communicating over a radio link in a communications system. The wireless device 130 comprised in the wireless communications network 100 may be enabled to communicate wirelessly in the wireless communications network 100. The communication may be performed e.g., via a RAN, and possibly the one or more core networks, which may comprised within the wireless communications network 100.

The wireless device 130 may be configured to communicate within the wireless communications network 100 with the network node 110 over a first link 141, e.g., a radio link. The network node 110 may be configured to communicate within the wireless communications network 100 with the virtual network node 116 over a second link 142, e.g., a radio link or a wired link.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second" and/or "third" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a wireless device, such as the wireless device 130, e.g., a 5G UE, and embodiments related to a network node, such as the network node 110, e.g., a gNB.

Embodiments of a method, performed by the wireless device 130, will now be described with reference to the flowchart depicted in FIG. 4. The method may be understood to be for handling a random access procedure in the wireless communications network 100 via the network node 110. The wireless device 130 operates in the communications network 100. In some non-limiting examples, the wireless device 130 may be operating in the wireless communications network 100 in unlicensed spectrum. In other non-limiting examples, the wireless device 130 may be operating in the wireless communications network 100 in licensed spectrum.

The method may comprise one or more of the following actions. In some embodiments, all the actions may be performed. In some embodiments, some of the actions may be performed. One or more embodiments may be combined, where applicable. Components from one example may be tacitly assumed to be present in another example and it will be obvious to a person skilled in the art how those components may be used in the other examples. All possible combinations are not described to simplify the description. A non-limiting example of the method performed by the wireless device 130 is depicted in FIG. 4. In FIG. 4, optional actions are indicated with a dashed box.

Action 401

In this Action 401, the wireless device 130 may send, to the network node 110 an indication of a capability of the wireless device 130. The capability is of, having received a first random access response message from the network node 110, to continuing monitoring, simultaneously, a) a radio channel, for further random access response messages from the network node 110 addressed to a temporary identifier, and b) the radio channel, addressed to a temporary identifier specifically addressing the wireless device 130, that is, addressed to another temporary identifier, specifically addressing the wireless device 130.

The radio channel the wireless device 130 may have the capability to continuously monitor may be a Physical Downlink Control Channel (PDCCH).

The random access response message may be, e.g., Msg2 or RAR.

In some embodiments, the temporary identifier to which the further random access response messages may be addressed may be a Random Access Radio Network Temporary Identifier (RA-RNTI). The temporary identifier specifically addressing the wireless device 130 may be a Temporary Cell Radio Network Temporary Identifier (TC-RNTI), or a Cell Radio Network Temporary Identifier (C-RNTI).

The sending in this Action 401 may be performed, e.g., via the first link 141.

In a particular group of examples, a new UE capability may be defined concerning whether the wireless device 130 supports simultaneous monitoring of PDCCHs addressed to both RA-RNTI and TC-RNTI while the RAR window (ra-Response Window) is running.

By sending the indication of its capability to the network node 110, the wireless device 130 may enable the network node 110 to be aware of whether there is at least one wireless device in the cell 120 supporting simultaneous monitoring of the radio channel, e.g., PDCCH, addressed to both, the temporary identifier, e.g., RA-RNTI, and the temporary identifier specifically addressing the wireless device 130, e.g., TC-RNTI, while a time window for receiving a response to the sent first message, such as the RAR window, e.g., the ra-ResponseWindow, is running. This in turn may be understood to enable the network node 110 to react to a RA in a more flexible fashion aiming to provide more transmission opportunities for a third message in the random access procedure, e.g., an Msg3.

Action 402

At some point in the course of communications in the wireless communications network 100, e.g., when the wireless device 130 may have some data to transmit, the wireless device 130 may send a first message to the network node 110 requesting random access, e.g., by transmitting a preamble. The first message may be, e.g., Msg1 or a message comprising a random access preamble.

When doing so, the wireless device 130 may start a timer for a time window for receiving a response to the sent first message, that is, a random access response message, from the network node 110. "The timer for a time window" may be understood to be equally expressed as a timer controlling the time window, a timer keeping track of the time window, a timer counting the duration of the time window, or similar expressions.

An example of such a timer may be ra-ResponseWindow.

In contrast to existing methods, according to embodiments herein, the wireless device 130 in this Action 402, refrains, after having sent the first message to the network node 110 requesting random access and having received the first random access response message from the network node 110, from stopping the timer for the time window for receiving the random access response message.

Refraining from stopping may be understood as not stopping, in this case, the timer. It may be understood that this action may be implemented by the wireless device 130 in equivalent actions, such as keeping the timer running to the configured time, extending a duration of the timer, resetting the timer to extend the duration of the timer, restarting the timer, etc. . . . Any of these actions may be understood to have a common denominator, namely, to avoid, or delay, closing the time window for receiving further random access response messages.

It is noted that any expression herein of "stopping the time window", or similar, may be understood to refer to stopping the timer for the time window.

By refraining from stopping the timer in this Action 402, the wireless device 130 enables to reduce the probability of a reception failure occurring. By refraining from stopping the timer in this Action 402, the wireless device 130 may receive any possible retransmission of the first random access response message from the network node 110, which may occur if the network node 110 fails to receive the third message in the random access procedure, e.g., Msg3, which the wireless device 130 may send according to Action 404, as described later. Therefore, the wireless device 130 may avoid having to switch to the initial phase, that is, without having to re-initiate the random access procedure, after expiration of the timer, which would in turn increase the latency for RA access. Hence, thanks to the performance of this Action 402, the random access latency may be reduced, and unnecessary transmissions may be minimized.

Action 403

In this Action 403, the wireless device 130, continues monitoring 403 both: a) the radio channel for further random access response messages from the network node 110 addressed to the temporary identifier, and b) the radio channel, addressed to the temporary identifier specifically addressing the wireless device 130.

As stated above, the temporary identifier to which the further random access response messages may be addressed may be an RA-RNTI. The temporary identifier specifically addressing the wireless device 130 may be a TC-RNTI, or a C-RNTI. In some examples, the wireless device 130 may continue monitoring the radio channel addressed to the temporary identifier, e.g., Random Access-Radio Network Temporary identifier (RA-TNTI), or the radio channel addressed to the temporary identifier specifically addressing the wireless device 130, such as e.g., TC-RNTI, or both.

The radio channel may be, e.g., the PDCCH. In some examples, the wireless device 130 may continue monitoring for PDCCH addressed to the RA-TNTI, for the PDCCH addressed to the temporary cell radio network temporary identifier (TC-RNTI), or for both.

The continuing monitoring in this Action 403 may be performed, e.g., via the first link 141. In some embodiments, the continuing monitoring of this Action 403 of the radio channel may be performed across a plurality of different subbands, channels, bandwidth parts, cells, or carriers.

In some non-limiting examples, the wireless device 130 may continue monitoring the radio channel in the unlicensed spectrum for further random access response messages from the network node 110.

In some embodiments, the continuing monitoring in this Action 403 of the radio channel may be until a maximum running time of the time window expires. That is, a maximum duration of the timer expires.

In a first group of examples, in a RA procedure, after the wireless device 130 may have successfully received a RAR message containing a Random Access Preamble identifier that matches the transmitted PREAMBLE_INDEX, the wireless device 130 may be configured to, according to Action 402, not stop ra-ResponseWindow, and hence continue monitoring, according to this Action 403, PDCCH addressed to RA-RNTI for further Random Access Response(s), while performing transmission attempts for Msg3 and, regardless of whether the LBT operation succeeds or fails for Msg3. In this way, while the ra-ResponseWindow is running, the wireless device 130 may start to monitor PDCCH addressed to TC-RNTI received from the received RAR when the wireless device 130 may have missed all transmission occasions for Msg3 allocated in the received RAR. At the same time the wireless device 130 may be also monitoring PDCCH addressed to RA-RNTI.

In another group of examples, the wireless device 130 may continue to monitor the PDCCH transmission addressed to the RA-RNTI until the configured ra-Response Window expires or until the maximum configurable ra-Response Window expires, 20 ms for NR-U, 10 ms for NR. Monitoring until the maximum configurable ra-Response Window expires may be understood to be beneficial since there may be a considerably longer time when the wireless device 130 may monitor both PDCCH transmission addressed to the RA-RNTI, and PDCCH addressed to TC-RNTI.

In yet another group of examples, the function of whether the wireless device 130 may support simultaneous monitoring of PDCCHs addressed to both RA-RNTI and TC-RNTI while the RAR window is running may be configured per service, LCH, and/or RA event.

In a further group of examples, the wireless device 130 may be configured to monitor both RA-RNTI and TC-RNTI while the RAR window is running in a RA procedure, across different subbands, channels, Bandwidth Parts (BWPs), cells, and/or carriers.

The period of time in which the wireless device 130 may need to monitor both the PDCCH addressed to the TC-RNTI and RA-RNTI may start upon receiving the RAR, and continue until the wireless device 130 may receive a first Msg3 grant addressed to the TC-RNTI for Msg3 retransmission. Or, in another alternative, it may continue until the reception of PDCCH transmission from the network node 110 addressed to the C-RNTI, e.g., Msg4, or until the ra-Response Window timer expires.

By, in this Action 403, continuing to monitor both: a) the radio channel for further random access response messages from the network node 110 addressed to the temporary identifier, and b) the radio channel, addressed to the temporary identifier specifically addressing the wireless device 130, the wireless device 130 enables to reduce the probability of a reception failure occurring. This is because the wireless device 130 may be enabled to continue the random access procedure keeping all possible options open and running, at the same time. That is, the wireless device 130 may, on the one hand, continue the random access procedure assuming the network node 110 may retransmit the random access response message, and monitor the radio channel, e.g., PDCCH addressed to the temporary identifier, e.g., the RA-RNTI. At the same time, the wireless device 130 may, on the other hand, continue the random access procedure assuming the network node 110 may send a grant for retransmission of the third message, and while the timer is running, start to also monitor the radio channel, e.g., PDCCH, addressed to the temporary identifier specifically addressing the wireless device 130, e.g., TC-RNTI. By doing so, the wireless device 130 may then be ready to continue the random access procedure based on the action the network node 110 may take, without jeopardizing creating a radio link failure, keeping all potential outcomes open and ready to be continued without having to switch to the initial phase, that is, to without having to re-initiate the random access procedure, after expiration of the timer, which would in turn increase the latency for RA access. Hence, thanks to the performance of this Action 403, the random access latency may be reduced, and unnecessary transmissions may be minimized.

Action 404

In this Action 404, the wireless device 130 may initiate sending to the network node 110, simultaneously to the continuing monitoring of Action 403, one or more third messages in the random access procedure. The continuing monitoring in Action 403 of the radio channel may be independent of whether or not the sending of the one or more third messages is successful.

The third messages may be, e.g., Msg3 or a message comprising an identifier of the wireless device 130.

Initiating sending in this Action 404 may be understood as triggering, starting, enabling, sending, or similar. The sending may be performed, e.g., via the first link 141.

In some non-limiting examples, the wireless device 130 may initiate sending to the network node 110, simultaneously to the continuing monitoring of Action 403, the one or more third messages in the random access procedure in the unlicensed spectrum.

In some examples, the wireless device 130 may start to continue monitoring, both: a) the radio channel for further random access response messages from the network node 110 addressed to the temporary identifier, and b) the radio channel, addressed to the temporary identifier specifically addressing the wireless device 130 according to Action 403, upon initiating sending at least one of the one or more third messages, according to this Action 404.

That the continuing monitoring in Action 403 of the radio channel may be independent of whether or not the sending of the one or more third messages is successful may be understood to mean, for example, that the continuing monitoring may be independent of whether: 1) LBT, if performed, is successful, and the wireless device 130 is able to transmit at least one of the one or more third messages, and 2) there may be LBT failures, if LBT is attempted, and the wireless device 130 is not able to transmit at least one of the one or more third messages.

In some embodiments, to initiate sending, according to Action 404, of the one or more third messages to the network node 110, simultaneously to the continuing monitoring of Action 403, and in the unlicensed spectrum, may be configured per one of: service, Logical Channel, LCH, and random access event.

In some examples wherein the wireless device 130 may have performed Action 401, the capability may be to initiate the sending to the network node 110, according to Action 404, the one or more third messages in the unlicensed spectrum, simultaneously to the continuing monitoring of Action 403.

By the wireless device 130, in this Action 404, initiating the sending of the one or more third messages, it increases the chances of at least one of the one or more third messages to be successfully received by the network node 110. Furthermore, similarly to what has been explained for Action 403, by, in this Action 404, initiating the sending of the one or more third messages simultaneously to continuing the monitoring of Action 403, the wireless device 130 enables to reduce the probability of a reception failure occurring. This is because the wireless device 130 may be enabled to continue the random access procedure keeping all possible options open and running, at the same time. That is, the wireless device 130 may, on the one hand, continue the random access procedure assuming the network node 110 may send a grant for retransmission of the third message. At the same time, the wireless device 130 may, on the other hand, continue the random access procedure assuming the network node 110 may retransmit the random access response message, e.g., the first random access response message. By doing so, the wireless device 130 may then be ready to continue the random access procedure based on the action the network node 110 may take, without jeopardizing creating a radio link failure, keeping all potential outcomes open and ready to be continued without having to switch to the initial phase, that is, without having to re-initiate the random access procedure, after expiration of the timer, which would in turn increase the latency for RA access. Hence, thanks to the performance of this Action 404, the random access latency may be reduced, and unnecessary transmissions may be minimized.

Action 405

In some embodiments, the first random access response message from the network node 110 may comprise a first grant. In some of such embodiments, the wireless device 130 may, in this Action 405, while continuing monitoring 403 the radio channel, receive one or more second random access response messages from the network node 110. The one or more second random access response messages from the network node 110 may comprise a respective second grant. In such embodiments, the wireless device 130 may initiate sending, in Action 404, the one or more third messages according to the received first grant and one or more respective second grants.

In some embodiments, the first grant and the one or more respective second grants may be one of: the same or different.

The receiving in this Action 405 may be implemented, e.g., via the first link 141.

In a particular group of examples, the wireless device 130 may take one of the following optional actions while monitoring PDCCHs addressed to both RA-RNTI and TC-RNTI.

In a first optional action, the wireless device 130 may receive a new RAR, e.g., PDCCH addressed to the RA-RNTI. The wireless device 130 may then receive separate grants for Msg3, which may then indicate more transmission resources and occasions for Msg3. The MAC of the wireless device 130 may also receive a RAR carrying the same grant as that which may have been received in the previous RAR. The wireless device 130 may just process the RAR messages, and store the received grants for Msg3. The MAC of the wireless device 130 may then perform LBT operations and subsequent transmission attempts for Msg3 according to each received grant. In particular, whenever a new grant for Msg3 may be received on the RAR, the wireless device 130 may discard the previously received grant for Msg3 in a previous RAR, that is, the wireless device 130 may adopt for Msg3 transmission the latest received RAR. In some examples, whenever a new RAR is received, the wireless device 130 may flush the Msg3 HARQ buffer and generate a new HARQ process to deliver the Msg3. In alternative examples, the wireless device 130 may keep the Msg3 HARQ buffer also when the RAR is received again, as long as the already generated Transport Block (TB) for the Msg3 fits in the UL grant indicated in the new RAR. In this latter case, the network, e.g., the network node 110, may be required to not change the size of the UL grant provided to the wireless device 130 in the different transmissions of the RAR.

In some examples, the wireless device 130 may start monitoring the PDCCH addressed to the RA-RNTI upon sending the Random access preamble, and it may stop monitoring the PDCCH addressed to the RA-RNTI whenever any of the following events may occur: 1) upon receiving a Msg3 grant addressed to the TC-RNTI for the Msg3 retransmission, that is, upon reception of the first grant addressed to the TC-RNTI; 2) upon reception of PDCCH transmission from the network node 110 addressed to the C-RNTI; 3) when the ra-Response Window timer expires; this may be understood to imply that upon reception of the RAR message, the wireless device 130 may not stop the ra-Response Window timer, which may be started upon transmitting the preamble; and 4) whenever any of the above event occurs, whichever comes first.

In a second optional action, the wireless device 130 may receive grants for retransmission of the initial Msg3, e.g., PDCCH addressed to TC-RNTI. The wireless device 130 may store the received grants, and perform LBT operations and subsequent retransmission attempts for Msg3 according to each received grant. Unlike in the first option action, if the Msg3 grant, with PDCCH addressing the TC-RNTI, for retransmission is received, the wireless device 130 may keep the Msg3 HARQ buffer. Upon receiving such Msg3 grant for retransmission, the wireless device 130 may stop monitoring the PDCCH addressed with RA-RNTI, that is, may stop monitoring RAR.

In yet a third optional action, the wireless device 130 may receive a fourth message, e.g., Msg4, from the network node 110, as will be described below in Action 409.

Therefore, the period of time in which the wireless device 130 may need to monitor both the PDCCH addressed to the TC-RNTI and RA-RNTI may start upon receiving the RAR, and continue until the wireless device 130 may receive a first Msg3 grant addressed to the TC-RNTI for Msg3 retransmission. Or, in another alternative, it may continue until the reception of PDCCH transmission from the network node 110 addressed to the C-RNTI, e.g., Msg4, or until the ra-Response Window timer expires.

By, in this Action 405, receiving the one or more second random access response messages, the wireless device 130 is enabled to initiate sending the one or more third messages according to the received first grant and one or more respective second grants. The wireless device 130 may be understood to thereby be enabled to maximize the chances of the random access process continuing successfully, without having to switch to the initial phase, that is, to re-initiate the random access procedure, after expiration of the timer, which would in turn increase the latency for RA access. Hence, thanks to the performance of this Action 405, the random access latency may be reduced, and unnecessary transmissions may be minimized.

Action 406

In some embodiments, wherein the first random access response message from the network node 110 may comprise the first grant, the wireless device 130 may, in this Action 406, while continuing monitoring in Action 403 the radio channel, receive a plurality of downlink control information messages from the network node 110. Each message in the plurality of downlink control information messages from the network node 110 may comprise a respective third grant. In such embodiments, the wireless device 130 may initiate sending, in Action 404, the one or more third messages according to the received respective third grants.

The receiving in this Action 406 may be performed, e.g., via the first link 141.

In some embodiments, each of the respective third grants may be for a respective retransmission of the one or more third messages.

By, in this Action 406, receiving the plurality of downlink control information messages, the wireless device 130 is enabled to initiate sending the one or more third messages according to the received respective third grants. The wireless device 130 may be understood to thereby be enabled to maximize the chances of the random access process continuing successfully, without having to switch to the initial phase, that is, to re-initiate the random access procedure, after expiration of the timer, which would in turn increase the latency for RA access. Hence, thanks to the performance of this Action 406, the random access latency may be reduced, and unnecessary transmissions may be minimized.

Action 407

In this Action 407, the wireless device 130 may process any PDCCH message simultaneously received from the network node 110, after sending the first message, during the time window. The processing in this Action 407 may be based on one of the following rules. According to a first rule, the wireless device 130 may always process the PDCCH transmission addressed to a TC-RNTI. According to a second rule, the wireless device 130 may process the PDCCH transmission addressed to either a TC-RNTI or a RA-RNTI.

According to a third rule, the wireless device 130 may process the PDCCH transmission addressed to either a TC-RNTI or a RA-RNTI according to a respective probability of successful transmission.

In a particular group of examples, the wireless device 130 may detect both PDCCH transmissions addressed to RA-RNTI and TC-RNTI at the same time. The wireless device 130 may not be able to process reception for both. In this way, there may be different options to handle the colliding receptions. According to a first option, Option 1, the wireless device 130 may always process the PDCCH transmission addressed to TC-RNTI. According to a second option, Option 2, the wireless device 130 may be configured by the network to process either of the receptions. According to a third option, Option 3, the wireless device 130 may make its choice based on criteria, such as the wireless device 130 may choose the one that is able to provide higher successful probability for LBT operation. This may be determined based on where from, e.g., LBT subband, BWP, carrier, and/or cell, the PDCCH may be received, since different LBT subband, BWP, carrier, and/or cell may have different channel occupancy status or LBT failure status.

By, in this Action 407, processing any PDCCH message simultaneously received from the network node 110, the wireless device 130 is enabled to maximize the chances of the random access process continuing successfully, without having to switch to the initial phase, that is, to re-initiate the random access procedure, after expiration of the timer, which would in turn increase the latency for RA access. This is because, according to the rule applied, the wireless device 130 may maximize the chances of the random access procedure progressing to its most stage, without wasting time resources. Hence, thanks to the performance of this Action 407, the random access latency may be reduced, and unnecessary transmissions may be minimized.

Action 408

In some embodiments wherein Action 405 and Action 406 may have been performed, the respective received third grants may be for a respective retransmission of at least one of the one or more third messages, and the received respective second grants may be for at least one initial transmission of the one or more third messages. In some of these embodiments, the wireless device 130 may, in this Action 408, prioritize the received grants according to a criterion. The wireless device 130 may initiate sending 404 the one or more third messages according to the prioritized grants.

In some examples, the prioritizing may be according to one or more criteria.

In some embodiments, the criterion, or the one or more criteria, may be based on one of: i) an order to trigger transmission, and ii) a probability of successful Listen-Before-Talk operation.

In a particular group of examples, the wireless device 130 may receive and store multiple grants while parallel monitoring PDCCHs addressed to both RA-RNTI and TC-TNTI. Some of the grants may be assigned for initial transmissions of Msg3, while some other grants may be assigned for retransmissions of Msg3. For different grants for Msg3, which may be carried by the different RAR messages, the MAC of the wireless device 130 may need to prepare separate MAC Protocol Data Units (PDUs) and/or Transport Blocks (TBs) containing same MAC CE, RRC message, and data, but with different sizes. As a further action, the MAC of the wireless device 130 may need to prioritize grants in terms of criteria, such as: 1) which grant is first to trigger transmission? 2) which grant has higher probability to succeed LBT operation? Since the grants may belong to different LBT subband, BWP, and/or cells, therefore they may provide different probability of success depending on Channel Occupancy (CO) status or LBT failure statistics.

The MAC of the wireless device 130 may process each grant and prepare for a transmission attempt following a decreasing order of the priority. As soon as the wireless device 130 may have succeeded LBT operation for at least one grant, the MAC of the wireless device 130 may use other grants for other transmission purposes, such as transmission of UP data during the running RA procedure, or after the RA procedure has completed.

By, in this Action 408, prioritizing the received grants according to the criterion, the wireless device 130 is enabled to maximize the chances of the random access process continuing successfully while keeping the latency as short as possible. This is because, according to the criterion applied, the wireless device 130 may maximize the chances of the random access procedure progressing to its most stage, without wasting time resources. Hence, thanks to the performance of this Action 408, the random access latency may be reduced, and unnecessary transmissions may be minimized.

Action 409

In some alternative, or subsequent, embodiments to those described in Action 405, wherein the first random access response message from the network node 110 may comprise the first grant, the wireless device 130 may, in this Action 409, while continuing monitoring in Action 403 the radio channel, and after having sent at least one of the one or more third messages, receive, in response to the sent at least one of the one or more third messages, a fourth message from the network node 110.

The fourth message may be, e.g., Msg4.

In some of these embodiments, the radio channel being monitored may be the PDCCH, and reception of the PDCCH associated with the fourth message may be addressed to a C-RNTI, or a TC-RNTI.

The receiving in Action 409 may be performed, e.g., via the first link 141.

To describe the third optional action mentioned earlier in further detail, in some examples, the wireless device 130 may, according to this Action 409, receive a Msg4, e.g., PDCCH addressed to TC-RNTI. After receiving Msg4 successfully, that is, after receiving PDCCH transmission from the network node 110 addressed to e.g., the C-RNTI in a connected state scenario, or addressed to the TC-RNTI in an idle mode scenario, the wireless device 130 may stop the ra-ResponseWindow, and hence stop monitoring PDCCH addressed to RA-RNTI for further Random Access Response(s), if the ra-ResponseWindow is still running. The wireless device 130 may take further actions to continue the RA procedure according to what has been specified in clause 5.1.5 "Contention Resolution".

By the wireless device 130 receiving the fourth message in this Action 409, the wireless device 130 may be enabled to determine that at least one of the one or more third messages has been transmitted successfully, and received successfully by the network node 110, and then stop the timer in the next Action 410, thereby avoiding that further resources, e.g., radio frequency, processing and energy resources, are wasted.

Action 410

In some embodiments wherein Action 409 may have been performed, the wireless device 130 may, in this Action 410, stop, after receiving the fourth message, the timer for the time window for receiving the random access response message, if the maximum running time of the time window has not expired.

Stopping the timer may be understood as, e.g., closing, or stopping, the time window.

By the wireless device 130 stopping the timer after receiving the fourth message in this Action 410, the wireless device 130 may be enabled to prevent that further resources, e.g., radio frequency, processing and energy resources, are wasted monitoring, processing, sending or receiving messages from the network node 110, which may no longer be necessary once the wireless device 130 may have determined that at least one of the one or more third messages has been transmitted successfully, and received successfully by the network node 110.

Embodiments of a method performed by the network node 110 will now be described with reference to the flowchart depicted in FIG. 5. The method may be understood to be for handling the random access procedure by the wireless device 130 in the wireless communications network 100 via the network node 110. The network node 110 operates in the wireless communications network 100.

The method may comprise two or more of the following actions. Several embodiments are comprised herein. In some embodiments, some actions may be performed. In some embodiments, all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. A non-limiting example of the method performed by the network node 110 is depicted in FIG. 5. Some actions may be performed in a different order than that shown in FIG. 5. In FIG. 5, an optional action is represented in a box with dashed lines.

The detailed description of some of the following corresponds to the same references provided above, in relation to the actions described for the wireless device 130, and will thus not be repeated here to simplify the description. For example, the first message may be, e.g., Msg1 or a message comprising a random access preamble.

In some non-limiting examples, the network node 110 may be operating in the wireless communications network 100 in unlicensed spectrum. In other non-limiting examples, the network node 110 may be operating in the wireless communications network 100 in licensed spectrum.

Action 501

In this Action 501, the network node 110 may receive, from the wireless device, the indication of the capability of the wireless device 130 to continuously monitor, simultaneously, a) the radio channel for further random access response messages from the network node 110 addressed to the temporary identifier, and b) the radio channel, addressed to the temporary identifier specifically addressing the wireless device 130.

The receiving in this Action 501 may be performed, e.g., via the first link 141.

In some non-limiting examples, the indication may further indicate the capability of the wireless device 130 to initiate sending to the network node 110, the one or more third messages in the unlicensed spectrum, simultaneously to continuing monitoring the radio channel in the unlicensed spectrum for further random access response messages from the network node 110.

In some embodiments, the indication may further indicate that the radio channel may be monitored across a plurality of different subbands, channels, bandwidth parts, cells, or carriers.

In some embodiments, the indication may further indicate that to initiate sending the one or more third messages to the network node 110 in the unlicensed spectrum, simultaneously to continuing monitoring the radio channel in the unlicensed spectrum for further random access response messages from the network node 110, may be configured per one of: service, Logical Channel, LCH, and random access event.

Action 502

In this Action 502, the network node 110 receives, from the wireless device 130, the first message requesting random access.

The receiving in this Action 502 may be performed, e.g., via the first link 141.

In some non-limiting examples, the network node 110 may receive, from the wireless device 130, in the unlicensed spectrum, the first message requesting random access.

Action 503

In response to receiving the first message from the wireless device 130, the network node 110 may send the first random access response message, or the first random access response message and additional random access response messages, to the wireless device 130. That is, the network node 110 may send one or more random access response messages. In the simplest case, the network node 110 may send the first random access response message to the wireless device 130 in response to having received the first message.

After having sent the one or more random access response messages to the wireless device 130, and in absence of having received a third message in response from the wireless device 130 during at least one time period wherein reception is expected, in this Action 503, the network node 110 sends, to the wireless device 130, at least one of: i) one or more second random access response messages, that is, one or more additional random access response messages, as long as a time window for sending a random access response message to the wireless device 130 has not expired, and ii) the downlink control information indicating retransmission of the third message.

The sending in this Action 503 may be performed, e.g., via the first link 141.

In some embodiments, the sending in this Action 503 of the one or more second random access response messages may be in the radio channel addressed to the temporary identifier. In addition, the sending in this Action 503 of the downlink control information may be in the radio channel, addressed to the temporary identifier specifically addressing the wireless device 130.

The temporary identifier to which the second random access response messages may be addressed may be an RA-RNTI, and the temporary identifier specifically addressing the wireless device 130 may be a TC-RNTI or a C-RNTI.

In a particular group of examples, the network node 110 may choose one of the following three options to apply actions, in case the network node 110 may have already transmitted a RAR replying to a received PRACH preamble, and however, the network node 110 may not have received the corresponding Msg3 at the expected time. According to a first option, Option 1, the network node 110 may send another RAR corresponding to the received preamble while the ra-ResponseWindow is not expired; According to a second option, Option 2, the network node 110 may send a DCI addressed to the TC-RNTI which was sent to the wireless device 130 in the previous RAR. The DCI may indicate a retransmission for Msg3; According to a third option, Option 3, Option 1 and Option 2 both may be applied by the network node 110 at the same time.

By the network node 110, after having sent the one or more random access response messages, and in the absence of having received the third message in response, sending the at least one of one or more second random access response messages, and the downlink control information indicating retransmission of the third message, the network node 110 enables to reduce the probability of a communication failure occurring. This is because the network node 110 may increase the chances that the wireless device 130 either receives the at least one of one or more second random access response messages, or the downlink control information indicating that the network node 110 did not receive the third message, if the wireless device 130 had sent it, and the network node 110 may send a grant to the wireless device for retransmission of the third message. By doing so, the wireless device 130 may then be ready to continue the random access procedure without having to switch to the initial phase, that is, without having to re-initiate the random access procedure, after expiration of the timer, which would in turn increase the latency for RA access. Hence, thanks to the performance of this Action 503, the random access latency may be reduced, and unnecessary transmissions may be minimized.

Action 504

In this Action 504, the network node 110 may receive, from the wireless device 130, the one or more third messages in the random access procedure.

In some embodiments wherein the first random access response message from the network node 110 may comprise the first grant, and the one or more second random access response messages may comprise the respective second grant, the network node 110 may, in this Action 504, receive, from the wireless device 130, the one or more third messages in the random access procedure. In such embodiments, at least one of the one or more third messages may be received according to at least one of: a) the first grant, and b) at least one of the one or more respective second grants.

In some embodiments, the first grant and the one or more respective second grants may be one of: the same or different.

Each message in the plurality of downlink control information messages to the wireless device 130 may comprise a respective third grant.

In other embodiments wherein the first random access response message from the network node 110 may comprise the first grant, and the downlink control information may comprise the plurality of downlink control information messages to the wireless device 130, wherein each message in the plurality of downlink control information messages to the wireless device 130 may comprise a respective third grant, the network node 110 may, in this Action 504, receive, from the wireless device 130, the one or more third messages in the random access procedure. At least one of the one or more third messages may be received according to at least one of: a) the first grant, and b) the plurality of respective third grants The receiving in this Action 504 may be performed, e.g., via the first link 141.

In some non-limiting examples, the network node 110 may receive the one or more third messages in the random access procedure in the unlicensed spectrum.

In some embodiments, at least one of the one or more third messages may be received according to at least one of: a) the first grant, and b) the plurality of respective third grants.

In some embodiments, each of the respective third grants may be for a respective retransmission of the one or more third messages.

By the network node 110 receiving the one or more third messages in this Action 504, the network node 110 is enabled to continue the random access procedure and perform Action 505. In this way, the success probability of reception of the third message may be increased, and the random access latency may be reduced Action 505

In some embodiments, wherein the first random access response message may comprise the first grant, the network node 110 may in this Action 505, after having received at least one of the one or more third messages, send, in response to the received at least one of the one or more third messages, the fourth message to the wireless device 130.

The sending in this Action 505 may be performed, e.g., via the first link 141.

In some embodiments, the radio channel may be the PDCCH, and the PDCCH transmission associated with the fourth message may be addressed to the C-RNTI or the TC-RNTI.

By the network node 110 sending the fourth message in this Action 505, the network node 110 is enabled to provide contention resolution to the random access procedure, and provide access for the wireless device 130 to the wireless communications network 100. In this way, the network node 110 may avoid to send additional random access response messages or downlink control information signalling carrying a respective grant, for further retransmissions of the third message to the wireless device 130, thereby, saving resources.

Some embodiments herein will now be further described with some non-limiting examples.

In the following description, any reference to a/the UE, or simply "UE" may be understood to equally refer the wireless device 130; any reference to a/the gNBs, and/or a/the network may be understood to equally refer to the network node 110.

The methods described above are illustrated in the following figures.

Figure 6:
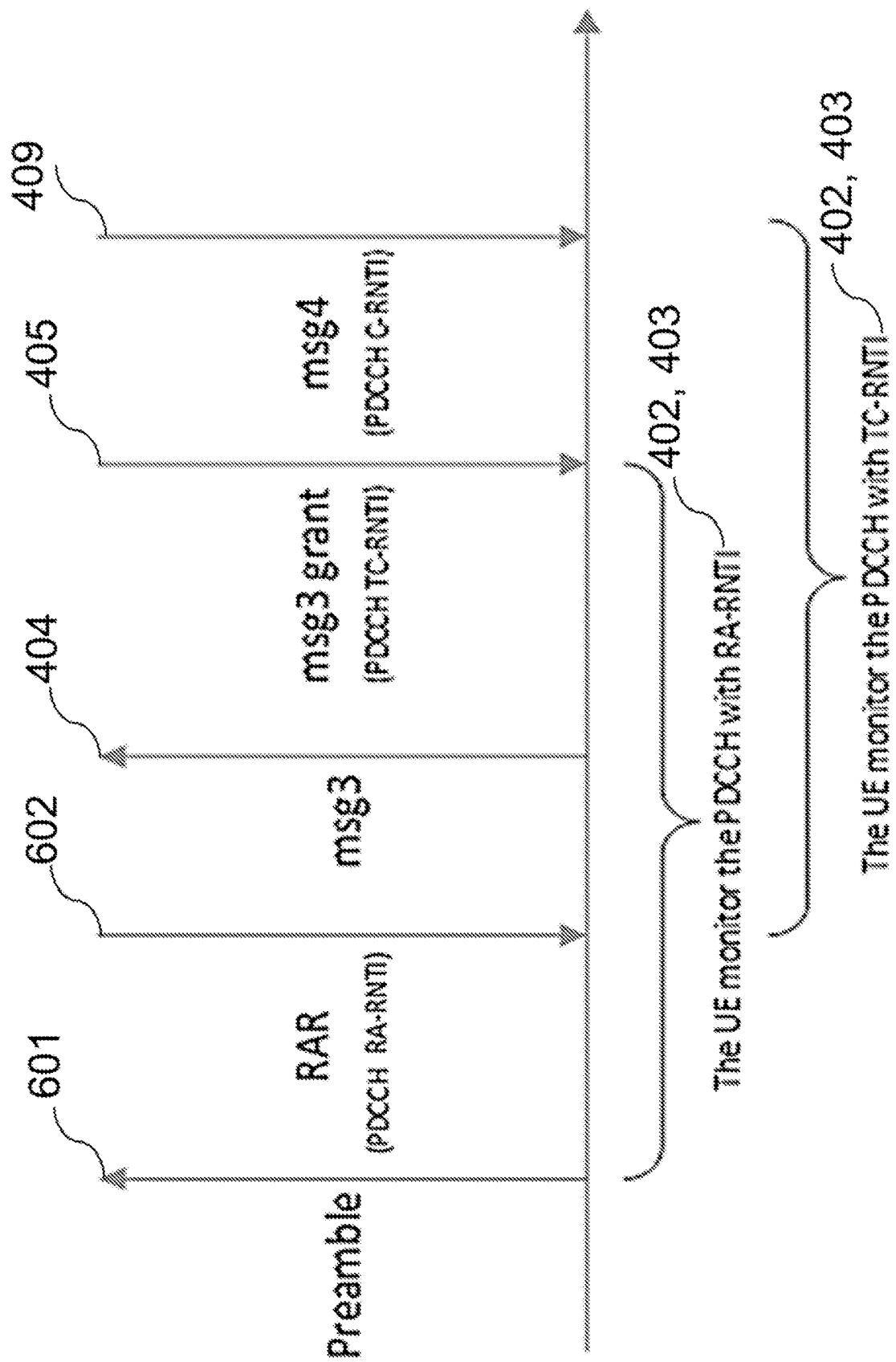
FIG. 6 is a schematic diagram illustrating embodiments of a method in a wireless device, according to embodiments herein.

FIG. 6 is a schematic diagram of a non-limiting example of embodiments herein. The horizontal arrow indicates time. At 601, the wireless device 130 sends the first message to the network node 110 comprising the preamble. At 602, the wireless device 130 receives the first random access response (RAR) message from the network node 110 in the PDCCH addressed to the RA-RNTI. In agreement with Action 402, the wireless device 130 refrains from stopping the timer, and continues monitoring, according to Action 403 both, the PDCCH for further random access response messages from the network node 110 addressed to the RA-RNTI, and the PDCCH, addressed to the TC-RNTI. In agreement with Action 404, the wireless device 130 initiates sending, to the network node 110, simultaneously to the continuing monitoring 403, the one or more Msg3. The wireless device 130 then, in agreement with Action 405, receives the one or more second random access response messages from the network node 110, comprising the respective second grant in the PDCCH addressed to the TC-RNTI. FIG. 6 illustrates that the wireless device 130, a UE in this example, stops monitoring the PDCCH with RA-RNTI at reception of a Msg3 grant with PDCCH TC-RNTI, but continues to monitor the PDCCH addressed to TC-RNTI. Subsequently, in agreement with Action 409, the wireless device 130 then receives the Msg4 in the PDCCH addressed to the C-RNTI when the wireless device 130 is in connected mode, as is the case in the non-limiting example depicted in FIG. 6, or e.g., addressed to the TC-RNTI when the wireless device 130 is in idle mode. The wireless device 130, upon receiving the Msg4, stops monitoring the PDCCH. As mentioned earlier, in some examples not depicted in FIG. 6, the wireless device 130 may start to continue monitoring, both: a) the PDCCH for further random access response messages from the network node 110 addressed to the RA-RNTI, and b) the PDCCH, addressed to the TC-RNTI, according to Action 403, upon initiating sending at least one of the one or more third messages, according to Action 404. The continuing monitoring in Action 403 of the radio channel may be independent of whether or not the sending of the one or more third messages is successful. For example, the continuing monitoring may be independent of whether: 1) LBT, if performed, is successful, and the wireless device 130 is able to transmit at least one of the one or more third messages, and 2) there may be LBT failures, if LBT is attempted, and the wireless device 130 is not able to transmit at least one of the one or more third messages.

Figure 7:
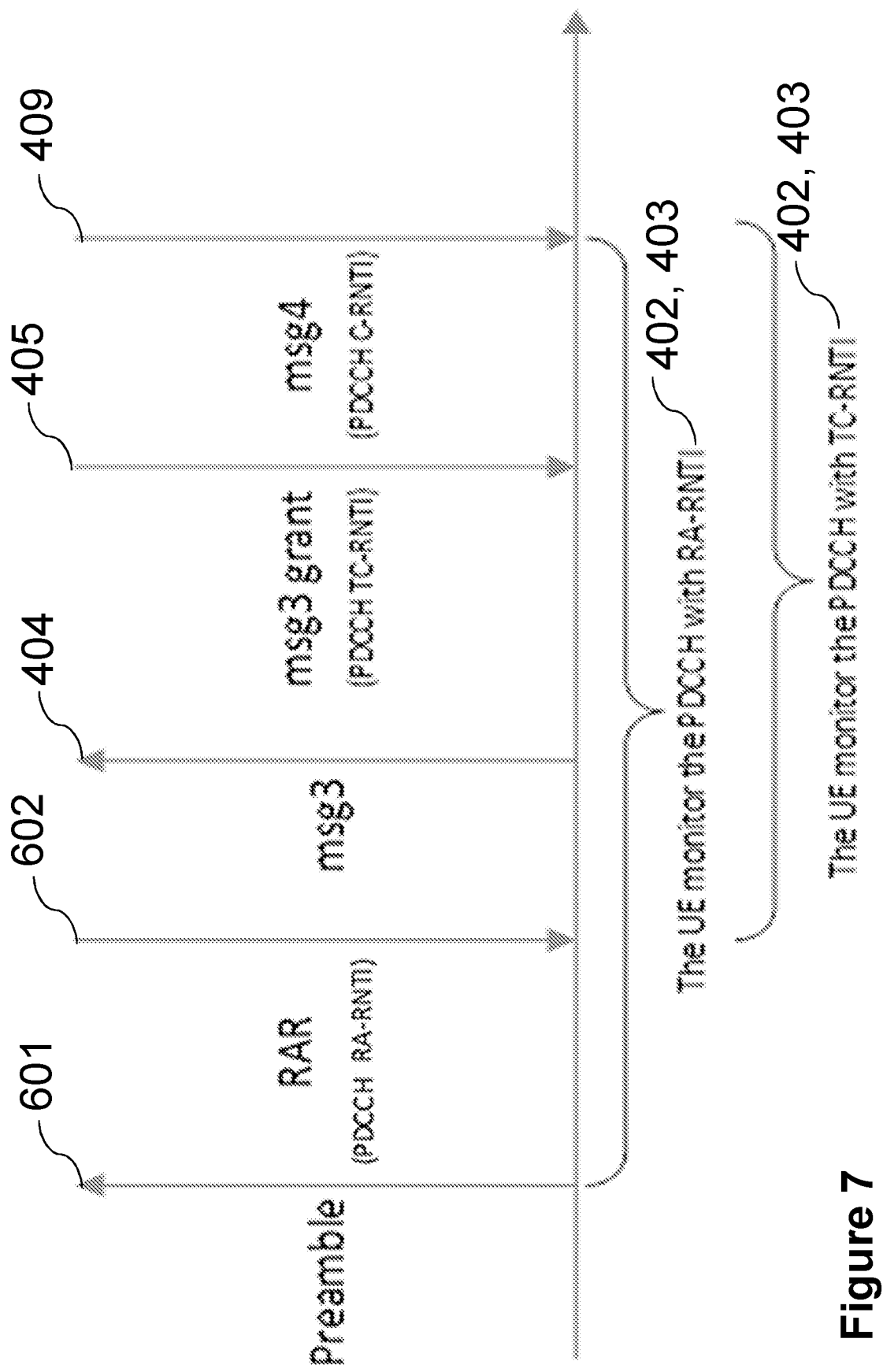
FIG. 7 is a schematic diagram illustrating embodiments of a method in a wireless device, according to embodiments herein.

FIG. 7 is a schematic diagram of another non-limiting example of embodiments herein. FIG. 7 has a similar description as FIG. 6, with the exception that FIG. 7 illustrates that the wireless device 130, a UE in this example, stops monitoring the RAR in the PDCCH addressed to the RA-RNTI, upon reception of Msg4, that is, PDCCH with C-RNTI when the wireless device 130 is in connected mode, as is the case in the non-limiting example depicted in FIG. 7, or e.g., addressed to the TC-RNTI when the wireless device 130 is in idle mode. As mentioned earlier, in some examples not depicted in FIG. 7, the wireless device 130 may start to continue monitoring, both: a) the PDCCH for further random access response messages from the network node 110 addressed to the RA-RNTI, and b) the PDCCH, addressed to the TC-RNTI, according to Action 403, upon initiating sending at least one of the one or more third messages, according to Action 404. The continuing monitoring in Action 403 of the radio channel may be independent of whether or not the sending of the one or more third messages is successful. For example, the continuing monitoring may be independent of whether: 1) LBT, if performed, is successful, and the wireless device 130 is able to transmit at least one of the one or more third messages, and 2) there may be LBT failures, if LBT is attempted, and the wireless device 130 is not able to transmit at least one of the one or more third messages.

Figure 8:
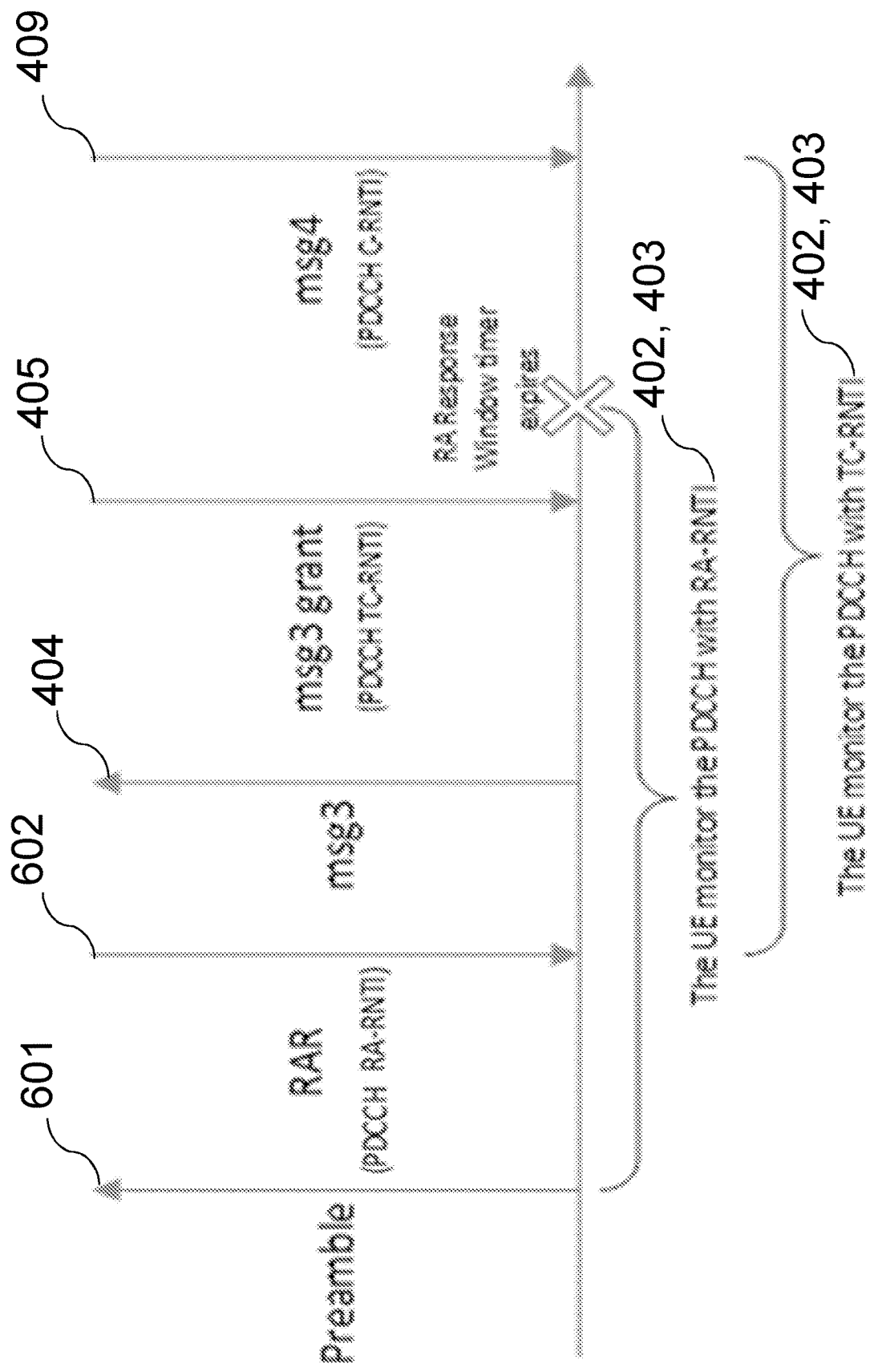
FIG. 8 is a schematic diagram illustrating embodiments of a method in a wireless device, according to embodiments herein.

FIG. 8 is a schematic diagram of a further non-limiting example of embodiments herein. FIG. 8 has a similar description as FIG. 6, with the exception that FIG. 8 illustrates that the wireless device 130, a UE in this example, stops monitoring the RAR, when the ra-ResponseWindow timer expires. The UE does not stop the ra-ResponseWindow timer at the first reception of RAR. As also mentioned above, the Msg4 is received in the PDCCH addressed to the C-RNTI when the wireless device 130 is in connected mode, as is the case in the non-limiting example depicted in FIG. 8, or e.g., addressed to the TC-RNTI when the wireless device 130 is in idle mode. As mentioned earlier, in some examples not depicted in FIG. 8, the wireless device 130 may start to continue monitoring, both: a) the PDCCH for further random access response messages from the network node 110 addressed to the RA-RNTI, and b) the PDCCH, addressed to the TC-RNTI, according to Action 403, upon initiating sending at least one of the one or more third messages, according to Action 404. The continuing monitoring in Action 403 of the radio channel may be independent of whether or not the sending of the one or more third messages is successful. For example, the continuing monitoring may be independent of whether: 1) LBT, if performed, is successful, and the wireless device 130 is able to transmit at least one of the one or more third messages, and 2) there may be LBT failures, if LBT is attempted, and the wireless device 130 is not able to transmit at least one of the one or more third messages.

As an summarized overview, embodiments herein may be understood to be different from the existing MAC specification according to which a UE MAC may stop the ra-ResponseWindow, and hence monitoring for Random Access Response(s), after successful reception of a Random Access Response containing a Random Access Preamble identifier that matches the transmitted PREAMBLE_INDEX, in that, according to embodiments herein, the UE may be configured to continue to monitor for PDCCH addressed to RA-RNTI for reception of a new RAR message until the, e.g., maximum configurable, ra-ResponseWindow expires, while performing transmission attempts for Msg3.

Embodiments herein may be summarized as follows. The wireless device 130 may be configured to not stop the ra-ResponseWindow, and hence monitoring for Random Access Response(s), after successful reception of a Random Access Response containing a Random Access Preamble identifier that matches the transmitted PREAMBLE_INDEX. After successful reception of a Random Access Response containing Random Access Preamble identifier that matches the transmitted PREAMBLE_INDEX, the MAC of the wireless device 130 may be configured to continue monitoring for PDCCH addressed to RA-TNTI, at the same time, the MAC of the wireless device 130 may also monitor for PDCCH addressed to TC-RNTI when the wireless device 130 may have missed all transmission occasions for Msg3 which may be allocated by the received RAR.

Figure 9:
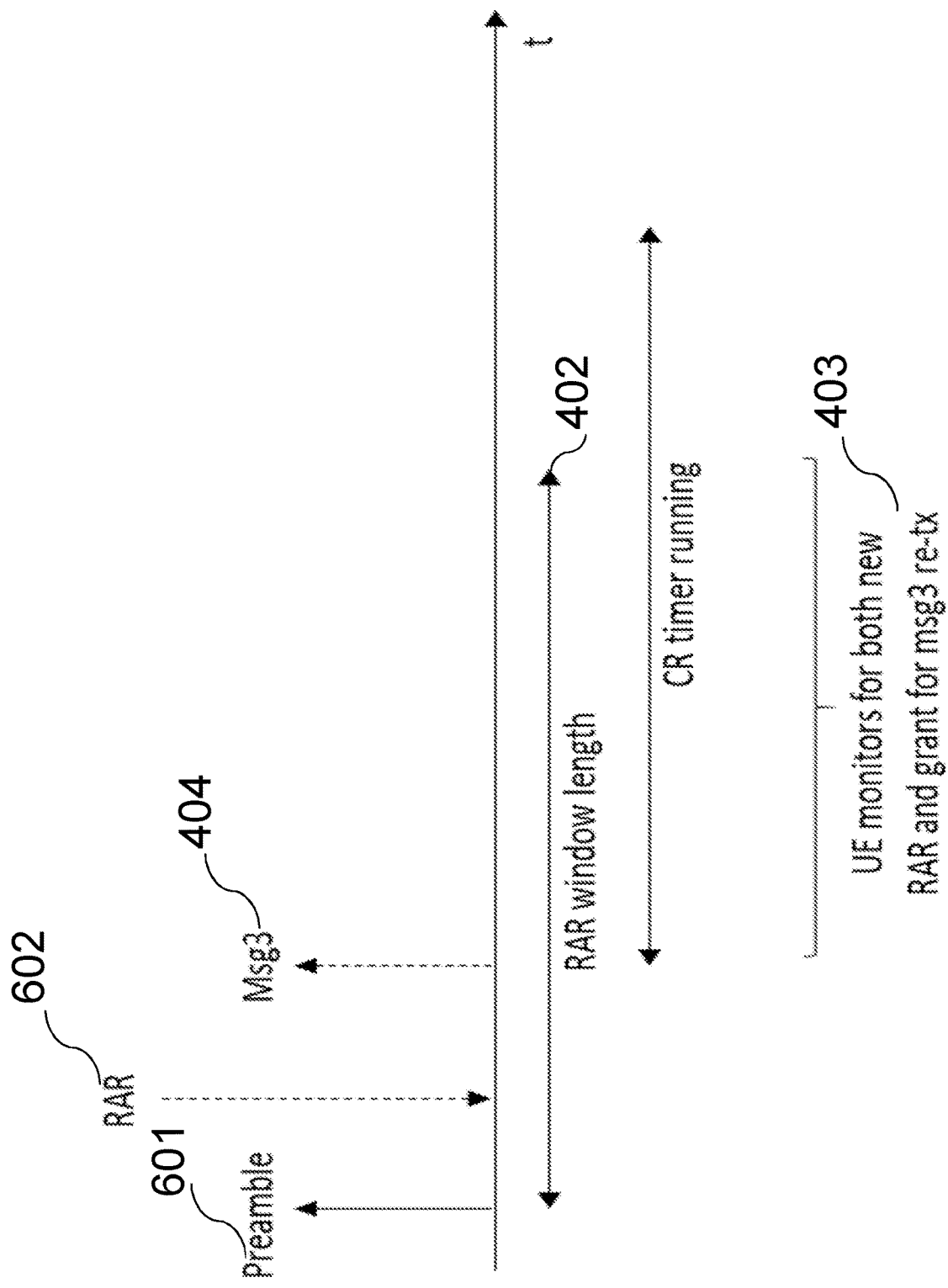
FIG. 9 is a schematic diagram illustrating embodiments of a method in a wireless device, according to embodiments herein.

FIG. 9 is a schematic diagram illustrating yet another example of embodiments herein, as described in the previous paragraph. When monitoring the PDCCH for DCI addressed to the TC-RNTI, that is, a DCI message with the CRC scrambled with the TC-RNTI, the wireless device 130, a UE in this example, may use a specific PDCCH search space for the RAR. FIG. 9 illustrates that the wireless device 130 monitors PDCCH addressed to RA-RNTI after a RAR has been received until the ra-Response Window expires simultaneously as the wireless device 130 monitors for PDCCH addressed to TC-RNTI, carrying a grant for an Msg3 retransmission (re-tx). This is performed while a Contention Resolution (CR) timer is running. The description of the Actions 601, 602, 402, 404, 403 is otherwise similar to that provided in FIG. 6.

Certain embodiments disclosed herein may provide one or more of the following technical advantage(s), which may be summarized as follows. With the mechanisms described in embodiments herein, the random access latency may be reduced, and unnecessary transmissions may be minimized.

Figure 10:
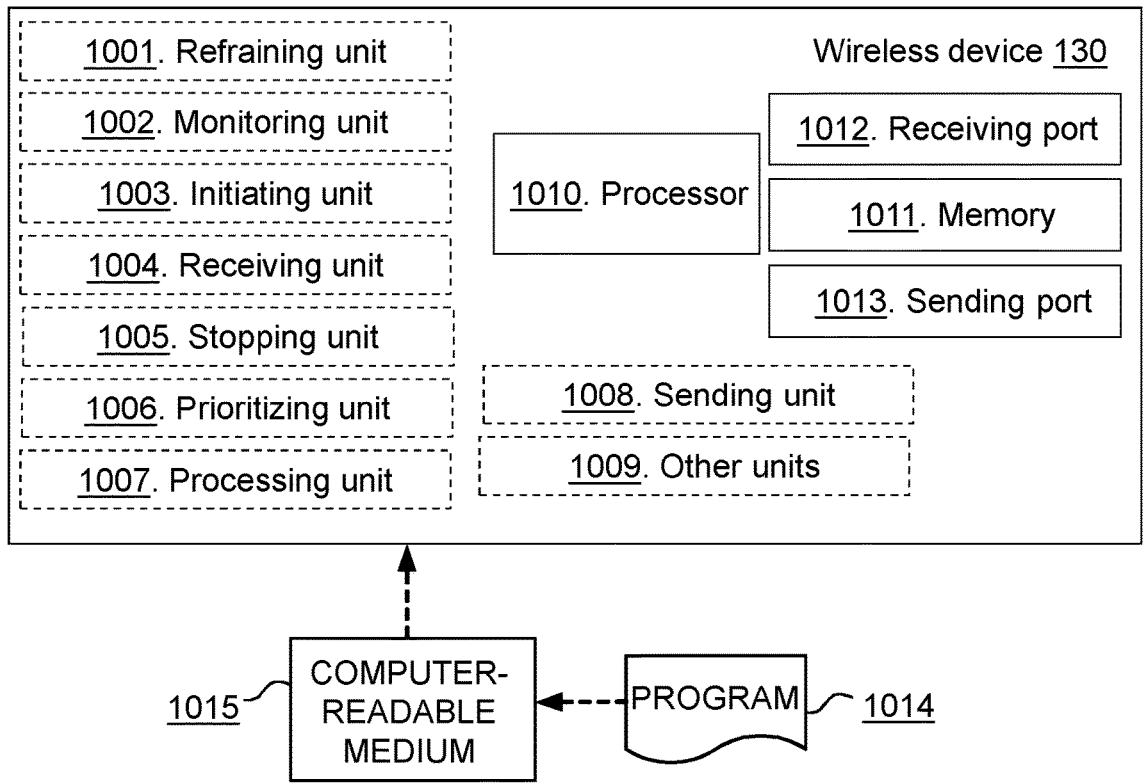
FIG. 10 is a schematic block diagram illustrating embodiments of a wireless device, according to embodiments herein.
Figure 10:
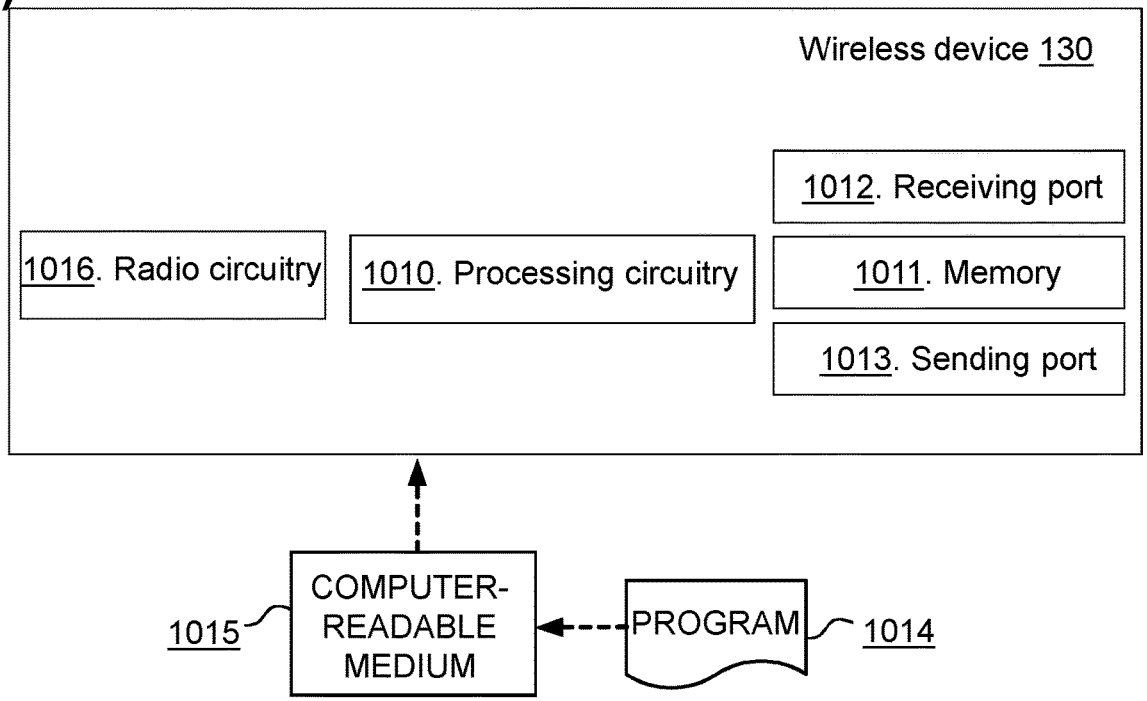

FIG. 10 depicts two different examples in panels a) and b), respectively, of the arrangement that the wireless device 130 may comprise to perform the method actions described above in relation to FIG. 4. In some embodiments, the wireless device 130 may comprise the following arrangement depicted in FIG. 10a. The wireless device 130 may be understood to be for handling the random access procedure in the wireless communications network 100 via the network node 110. The wireless device 130 is configured to operate in the wireless communications network 100.

In some non-limiting examples, the wireless device 130 may be configured to operate in the wireless communications network 100 in unlicensed spectrum. In other non-limiting examples, the wireless device 130 may be configured to operate in the wireless communications network 100 in licensed spectrum.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 10, optional units are indicated with dashed boxes.

The detailed description of some of the following corresponds to the same references provided above, in relation to the actions described for the wireless device 130, and will thus not be repeated here. For example, the first message may be configured to be, e.g., Msg1, or a message comprising a random access preamble.

The wireless device 130 is configured to perform the refraining of Action 402, e.g. by means of a refraining unit 1001 within the wireless device 130, configured to refrain, after having sent the first message to the network node 110 configured to request random access and having received the first random access response message from the network node 110, from stopping the timer for the time window for receiving the random access response message. The refraining unit 1001 may be a processor 1010 of the wireless device 130, or an application running on such processor.

The wireless device 130 is further configured to perform the providing of Action 403, e.g. by means of a monitoring unit 1002, configured to continue monitoring both: a) the radio channel for further random access response messages from the network node 110 addressed to the temporary identifier, and b) the radio channel, addressed to the temporary identifier configured to specifically address the wireless device 130. The monitoring unit 1002 may be a processor 1010 of the wireless device 130, or an application running on such processor.

In some embodiments, the temporary identifier to which the further random access response messages may be configured to be addressed may be configured to be the RA-RNTI, and the temporary identifier configured to specifically address the wireless device 130 may be configured to be the TC-RNTI, or the C-RNTI.

In some embodiments, the wireless device 130 may be further configured to perform the initiating sending of Action 404, e.g. by means of an initiating unit 1003, configured to initiate sending to the network node 110, simultaneously to the continuing monitoring, the one or more third messages in the random access procedure. The continuing monitoring of the radio channel may be configured to be independent of whether or not the sending of the one or more third messages is successful. The initiating unit 1003 may be a processor 1010 of the wireless device 130, or an application running on such processor.

In some examples, the wireless device 130 may be configured to start to continue monitoring, both: a) the radio channel for further random access response messages from the network node 110 addressed to the temporary identifier, and b) the radio channel, addressed to the temporary identifier specifically addressing the wireless device 130, upon initiating sending at least one of the one or more third messages.

In some embodiments, wherein the first random access response message from the network node 110 may be configured to comprise the first grant, the wireless device 130 may be further configured to, while continuing to monitor the radio channel, perform the receiving of Action 405, e.g. by means of a receiving unit 1004, configured to receive the one or more second random access response messages from the network node 110. The one or more second random access response messages from the network node 110 may be configured to comprise the respective second grant. The wireless device 130 may be further configured to initiate sending the one or more third messages according to the first grant and one or more respective second grants configured to be received. The receiving unit 1004 may be a processor 1010 of the wireless device 130, or an application running on such processor.

In some embodiments, wherein the first random access response message from the network node 110 may be configured to comprise the first grant, the wireless device 130 may be further configured to, while continuing to monitor the radio channel, perform the receiving of Action 406, e.g. by means of the receiving unit 1004, configured to receive the plurality of downlink control information messages from the network node 110. Each message in the plurality of downlink control information messages from the network node 110 may be configured to comprise the respective third grant. The wireless device 130 may be configured to initiate sending the one or more third messages according to the respective third grants configured to be received.

In some embodiments, wherein the first random access response message from the network node 110 may be configured to comprise the first grant, the wireless device 130 may be further configured to, while continuing to monitor the radio channel, and after having sent at least one of the one or more third messages, perform the receiving of Action 409, e.g. by means of the receiving unit 1004, configured to receive, in response to the at least one of the one or more third messages configured to be sent, the fourth message from the network node 110.

In some embodiments, the wireless device 130 may be further configured to perform the stopping of Action 410, e.g. by means of a stopping unit 1005, configured to stop, after receiving the fourth message, the timer for the time window for receiving the random access response message, if the maximum running time of the time window has not expired. The stopping unit 1005 may be a processor 1010 of the wireless device 130, or an application running on such processor.

In some embodiments, the radio channel configured to be monitored may be the PDCCH, and reception of the PDCCH associated with the fourth message may be configured to be addressed to the C-RNTI, or the TC-RNTI.

In some embodiments, wherein the respective third grants configured to be received may be configured to be for the respective retransmission of at least one of the one or more third messages, and the respective second grants configured to be received may be configured to be for at least one initial transmission of the one or more third messages, the wireless device 130 may be further configured to perform the prioritizing of Action 408, e.g. by means of a prioritizing unit 1006, configured to prioritize the grants configured to be received according to the criterion. In such embodiments, the wireless device 130 may be configured to initiate sending the one or more third messages according to the grants configured to be prioritized. The prioritizing unit 1006 may be a processor 1010 of the wireless device 130, or an application running on such processor.

In some embodiments, the continuing monitoring of the radio channel may be configured to be until the maximum running time of the time window expires.

In some embodiments, the wireless device 130 may be further configured to perform the processing of Action 407, e.g. by means of a processing unit 1007, configured to process any PDCCH message simultaneously received from the network node 110, after sending the first message, during the time window, based on one of the following rules: i) always process the PDCCH transmission configured to be addressed to a TC-RNTI, ii) process the PDCCH transmission configured to be addressed to either a TC-RNTI or a RA-RNTI, and iii) process the PDCCH transmission configured to be addressed to either a TC-RNTI or a RA-RNTI, according to a respective probability of successful transmission. The processing unit 1007 may be a processor 1010 of the wireless device 130, or an application running on such processor.

In some embodiments, the wireless device 130 may be further configured to perform the sending of Action 401, e.g. by means of a sending unit 1008, configured to send, to the network node 110 the indication of the capability of the wireless device 130 to continue monitoring, simultaneously, a) the radio channel, for further random access response messages from the network node 110 configured to be addressed to the temporary identifier, and b) the radio channel, configured to be addressed to the temporary identifier specifically addressing the wireless device 130. The sending unit 1008 may be a processor 1010 of the wireless device 130, or an application running on such processor.

Other units 1009 may be comprised in the wireless device 130.

The embodiments herein in the wireless device 130 may be implemented through one or more processors, such as a processor 1010 in the wireless device 130 depicted in FIG. 10a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 1011 comprising one or more memory units. The memory 1011 is arranged to be used to store obtained information, store data, configurations, schedulings, and applications etc. to perform the methods herein when being executed in the wireless device 130.

In some embodiments, the wireless device 130 may receive information from, e.g., the network node 110, through a receiving port 1012. In some embodiments, the receiving port 1012 may be, for example, connected to one or more antennas in wireless device 130. In other embodiments, the wireless device 130 may receive information from another structure in the wireless communications network 100 through the receiving port 1012. Since the receiving port 1012 may be in communication with the processor 1010, the receiving port 1012 may then send the received information to the processor 1010. The receiving port 1012 may also be configured to receive other information.

The processor 1010 in the wireless device 130 may be further configured to transmit or send information to e.g., the network node 110, or another structure in the wireless communications network 100, through a sending port 1013, which may be in communication with the processor 1010, and the memory 1011.

Those skilled in the art will also appreciate that the different units 1001-1009 described above may refer to a combination of analog and digital modules, and/or one or more processors configured with software and/or firmware, e.g., stored in memory, that, when executed by the one or more processors such as the processor 1010, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1001-1009 described above may be implemented as one or more applications running on one or more processors such as the processor 1010.

Thus, the methods according to the embodiments described herein for the wireless device 130 may be respectively implemented by means of a computer program 1014 product, comprising instructions, i.e., software code portions, which, when executed on at least one processor 1010, cause the at least one processor 1010 to carry out the actions described herein, as performed by the wireless device 130. The computer program 1014 product may be stored on a computer-readable storage medium 1015. The computer-readable storage medium 1015, having stored thereon the computer program 1014, may comprise instructions which, when executed on at least one processor 1010, cause the at least one processor 1010 to carry out the actions described herein, as performed by the wireless device 130. In some embodiments, the computer-readable storage medium 1015 may be a non-transitory computer-readable storage medium, such as a CD ROM disc, or a memory stick. In other embodiments, the computer program 1014 product may be stored on a carrier containing the computer program 1014 just described, wherein the carrier is one of an electronic signal, optical signal, radio signal, or the computer-readable storage medium 1015, as described above.

The wireless device 130 may comprise a communication interface configured to facilitate communications between the wireless device 130 and other nodes or devices, e.g., the network node 110. The interface may, for example, include a transceiver configured to transmit and receive radio signals over an air interface in accordance with a suitable standard.

In other embodiments, the wireless device 130 may comprise the following arrangement depicted in FIG. 10b. The wireless device 130 may comprise a processing circuitry 1010, e.g., one or more processors such as the processor 1010, in the wireless device 130 and the memory 1011. The wireless device 130 may also comprise a radio circuitry 1016, which may comprise e.g., the receiving port 1012 and the sending port 1013. The processing circuitry 1016 may be configured to, or operable to, perform the method actions according to FIG. 4, in a similar manner as that described in relation to FIG. 10a. The radio circuitry 1016 may be configured to set up and maintain at least a wireless connection with the network node 110. Circuitry may be understood herein as a hardware component.

Figure 4:
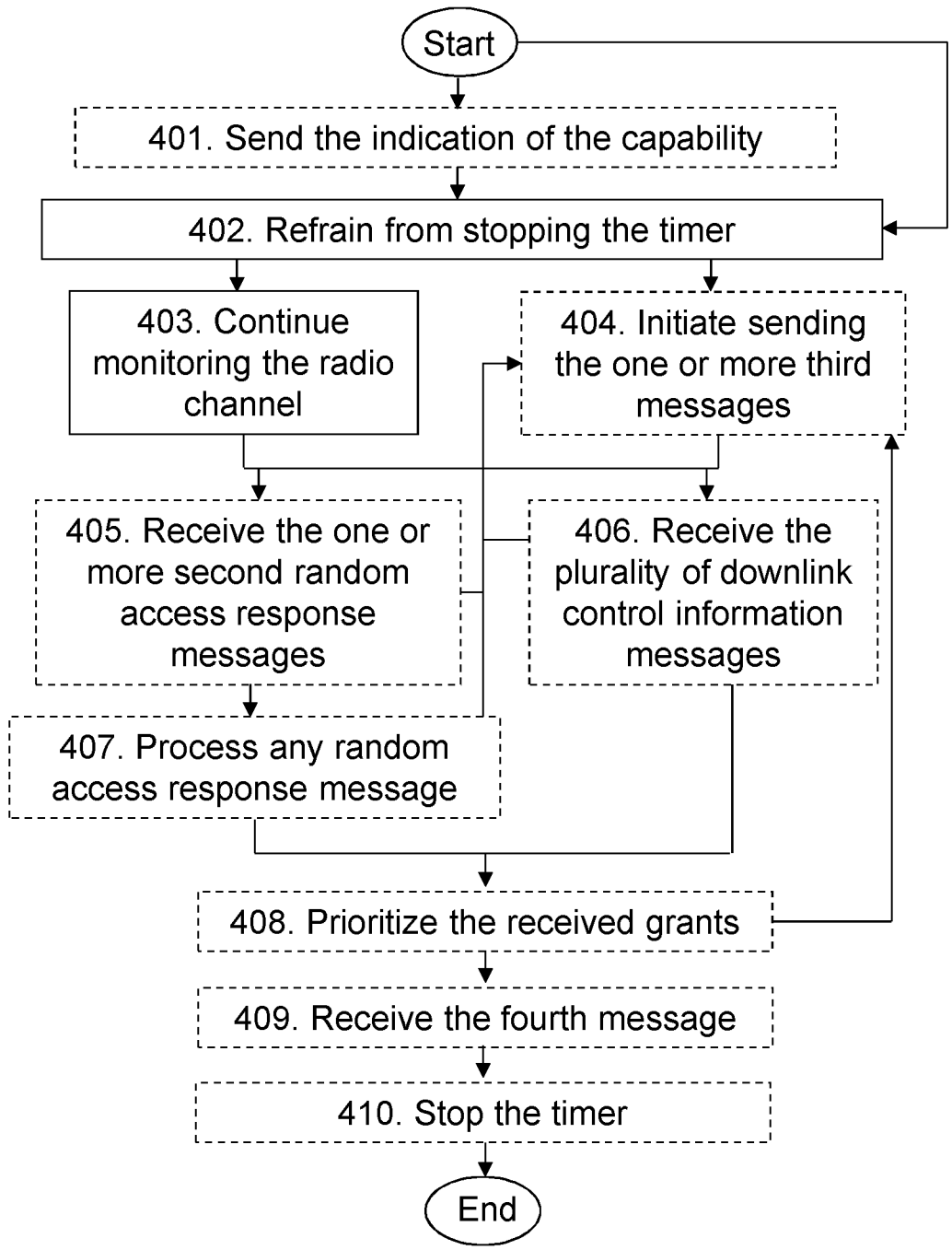
FIG. 4 is a flowchart depicting a method in a wireless device, according to embodiments herein.

Hence, embodiments herein also relate to the wireless device 130 comprising the processing circuitry 1010 and the memory 1011, said memory 1011 containing instructions executable by said processing circuitry 1010, whereby the wireless device 130 is operative to perform the actions described herein in relation to the wireless device 130, e.g., in FIG. 4, and/or any of FIGS. 6-9.

Figure 11:
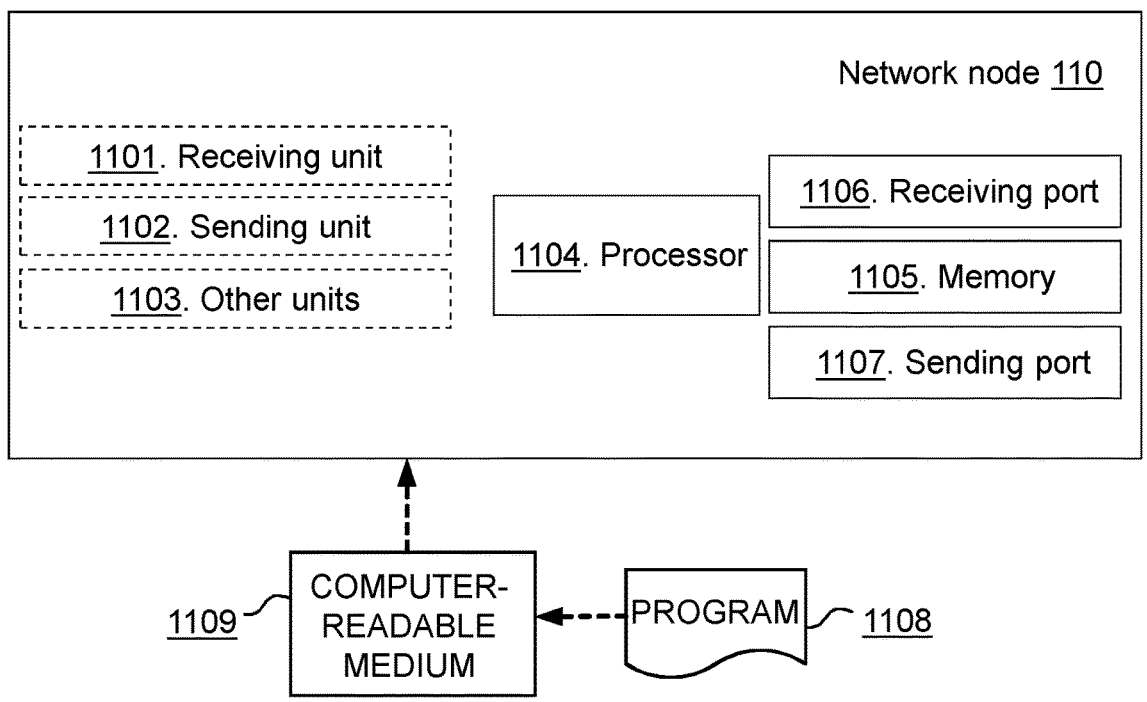
FIG. 11 is a schematic block diagram illustrating embodiments of a network node, according to embodiments herein.
Figure 11:
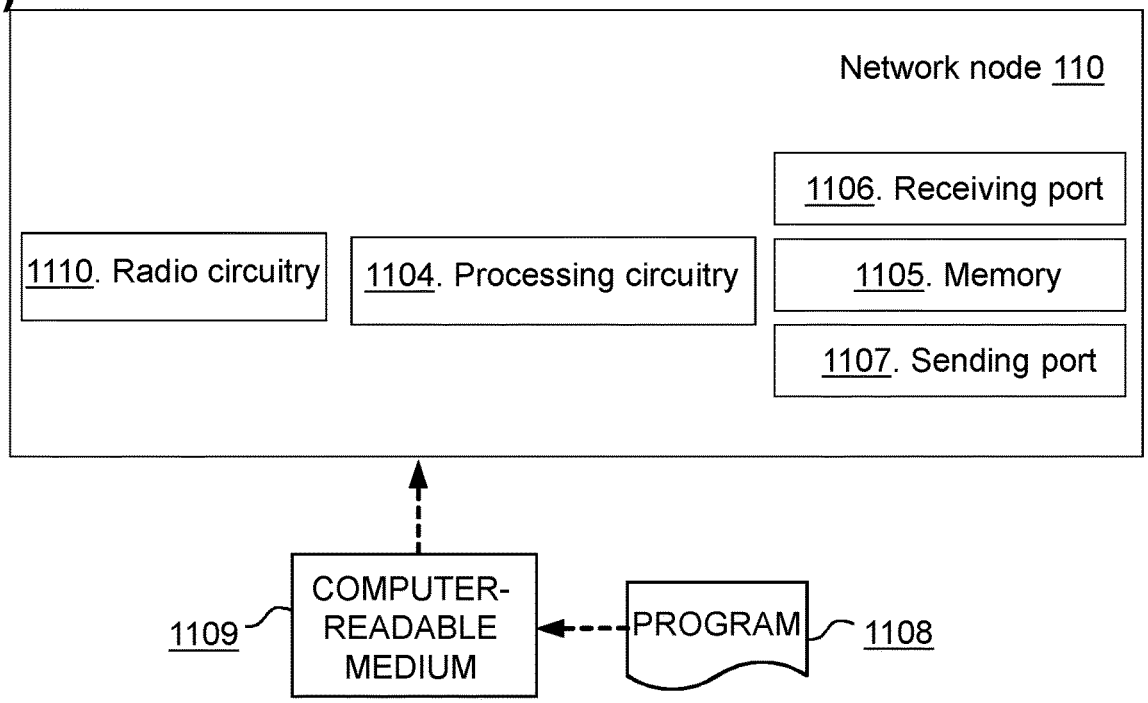

FIG. 11 depicts two different examples in panels a) and b), respectively, of the arrangement that the network node 110 may comprise to perform the method actions described above in relation to FIG. 5. In some embodiments, the network node 110 may comprise the following arrangement depicted in FIG. 11a.

The network node 110 may be understood to be for handling the random access procedure by the wireless device 130 in a wireless communications network 100 via the network node 110. The network node is configured to operate in the wireless communications network 100.

In some non-limiting examples, the network node 110 may be configured to operate in the wireless communications network 100 in unlicensed spectrum. In other non-limiting examples, the network node 110 may be configured to operate in the wireless communications network 100 in licensed spectrum.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments.

The detailed description of some of the following corresponds to the same references provided above, in relation to the actions described for the first network node 111, and will thus not be repeated here. For example, the first message may be configured to be, e.g., Msg1, or a message comprising a random access preamble.

In FIG. 11, optional units are indicated with dashed boxes.

The network node 110 is configured to perform the receiving of Action 502, e.g. by means of a receiving unit 1101 within the network node 110, configured to receive from the wireless device 130, the first message requesting random access. The receiving unit 1101 may be a processor 1104 of the network node 110, or an application running on such processor.

The network node 110 is further configured to perform the sending of Action 503, e.g. by means of a sending unit 1102 within the network node 110, configured to, after having sent the one or more random access response messages to the wireless device 130, and in absence of having received the third message in response from the wireless device 130 during at least one time period wherein reception is configured to be expected, send, to the wireless device 130, at least one of: i) one or more second random access response messages, as long as the time window for sending the random access response message to the wireless device 130 has not expired, and ii) downlink control information indicating retransmission of the third message. The sending unit 1102 may be a processor 1104 of the network node 110, or an application running on such processor.

In some embodiments, the sending of the one or more second random access response messages may be configured to be in the radio channel addressed to the temporary identifier, and the sending of the downlink control information may be configured to be in the radio channel, configured to be addressed to the temporary identifier specifically addressing the wireless device 130.

In some embodiments, the temporary identifier to which the second random access response messages may be configured to be addressed may be configured to be the RA-RNTI, and the temporary identifier configured to specifically address the wireless device 130 may be configured to be the TC-RNTI, or the C-RNTI.

In some embodiments, wherein the first random access response message from the network node 110 may be configured to comprise the first grant, and the one or more second random access response messages may be configured to comprise the respective second grant, the network node 110 may be further configured to, perform the receiving of Action 504, e.g. by means of the receiving unit 1101 within the network node 110, configured to receive, from the wireless device 130, the one or more third messages in the random access procedure. At least one of the one or more third messages may be configured to be received according to at least one of: a) the first grant, and b) at least one of the one or more respective second grants. The refraining unit 1001 may be a processor 1010 of the network node 110, or an application running on such processor.

In some embodiments, wherein the first random access response message from the network node 110 may be configured to comprise the first grant, and the downlink control information may be configured to comprise the plurality of downlink control information messages to the wireless device 130, wherein each message in the plurality of downlink control information messages to the wireless device 130 may be configured to comprise the respective third grant, the network node 110 may be further configured to perform the receiving of Action 504, e.g. by means of the receiving unit 1101 within the network node 110, configured to receive, from the wireless device 130 the one or more third messages in the random access procedure. At least one of the one or more third messages may be configured to be received according to at least one of: a) the first grant, and b) the plurality of respective third grants.

In some embodiments, wherein the first random access response message may be configured to comprise the first grant, the network node 110 may be further configured to, after having received at least one of the one or more third messages to perform the sending of Action 505, e.g. by means of the sending unit 1102 within the network node 110, configured to send, in response to the at least one of the one or more third messages configured to be received, the fourth message to the wireless device 130.

In some embodiments, the network node 110 may be further configured to, perform the receiving of Action 501, e.g. by means of the receiving unit 1101 within the network node 110, configured to receive, from the wireless device 130, the indication of the capability of the wireless device 130 to continuously monitor, simultaneously, a) the radio channel for further random access response messages from the network node 110 addressed to the temporary identifier, and b) the radio channel, addressed to the temporary identifier configured to specifically address the wireless device 130.

In some embodiments, the radio channel may be configured to be the PDCCH, and the PDCCH transmission associated with the fourth message may be configured to be addressed to the C-RNTI or the TC-RNTI.

Other units 1103 may be comprised in the network node 110.

The embodiments herein in the network node 110 may be implemented through one or more processors, such as a processor 1104 in the network node 110 depicted in FIG. 11*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 1105 comprising one or more memory units. The memory 1105 is arranged to be used to store obtained information, store data, configurations, schedulings, and applications etc. to perform the methods herein when being executed in the network node 110.

In some embodiments, the network node 110 may receive information from, e.g., the wireless device 130, through a receiving port 1106. In some embodiments, the receiving port 1106 may be, for example, connected to one or more antennas in network node 110. In other embodiments, the network node 110 may receive information from another structure in the wireless communications network 100 through the receiving port 1106. Since the receiving port 1106 may be in communication with the processor 1104, the receiving port 1106 may then send the received information to the processor 1104. The receiving port 1106 may also be configured to receive other information.

The processor 1104 in the network node 110 may be further configured to transmit or send information to e.g., the wireless device 130, or another structure in the wireless communications network 100, through a sending port 1107, which may be in communication with the processor 1104, and the memory 1105.

Those skilled in the art will also appreciate that the different units 1101-1103 described above may refer to a combination of analog and digital modules, and/or one or more processors configured with software and/or firmware, e.g., stored in memory, that, when executed by the one or more processors such as the processor 1104, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1101-1103 described above may be implemented as one or more applications running on one or more processors such as the processor 1104.

Thus, the methods according to the embodiments described herein for the network node 110 may be respectively implemented by means of a computer program 1108 product, comprising instructions, i.e., software code portions, which, when executed on at least one processor 1104, cause the at least one processor 1104 to carry out the actions described herein, as performed by the network node 110. The computer program 1108 product may be stored on a computer-readable storage medium 1109. The computer-readable storage medium 1109, having stored thereon the computer program 1108, may comprise instructions which, when executed on at least one processor 1104, cause the at least one processor 1104 to carry out the actions described herein, as performed by the network node 110. In some embodiments, the computer-readable storage medium 1109 may be a non-transitory computer-readable storage medium, such as a CD ROM disc, or a memory stick. In other embodiments, the computer program 1108 product may be stored on a carrier containing the computer program 1108 just described, wherein the carrier is one of an electronic signal, optical signal, radio signal, or the computer-readable storage medium 1109, as described above.

The network node 110 may comprise a communication interface configured to facilitate communications between the network node 110 and other nodes or devices, e.g., the wireless device 130. The interface may, for example, include a transceiver configured to transmit and receive radio signals over an air interface in accordance with a suitable standard.

In other embodiments, the network node 110 may comprise the following arrangement depicted in FIG. 11*b*. The network node 110 may comprise a processing circuitry 1104, e.g., one or more processors such as the processor 1104, in the network node 110 and the memory 1105. The network node 110 may also comprise a radio circuitry 1110, which may comprise e.g., the receiving port 1106 and the sending port 1107. The processing circuitry 1104 may be configured to, or operable to, perform the method actions according to FIG. 5, in a similar manner as that described in relation to FIG. 11*a*. The radio circuitry 1110 may be configured to set up and maintain at least a wireless connection with the wireless device 130. Circuitry may be understood herein as a hardware component.

Figure 5:
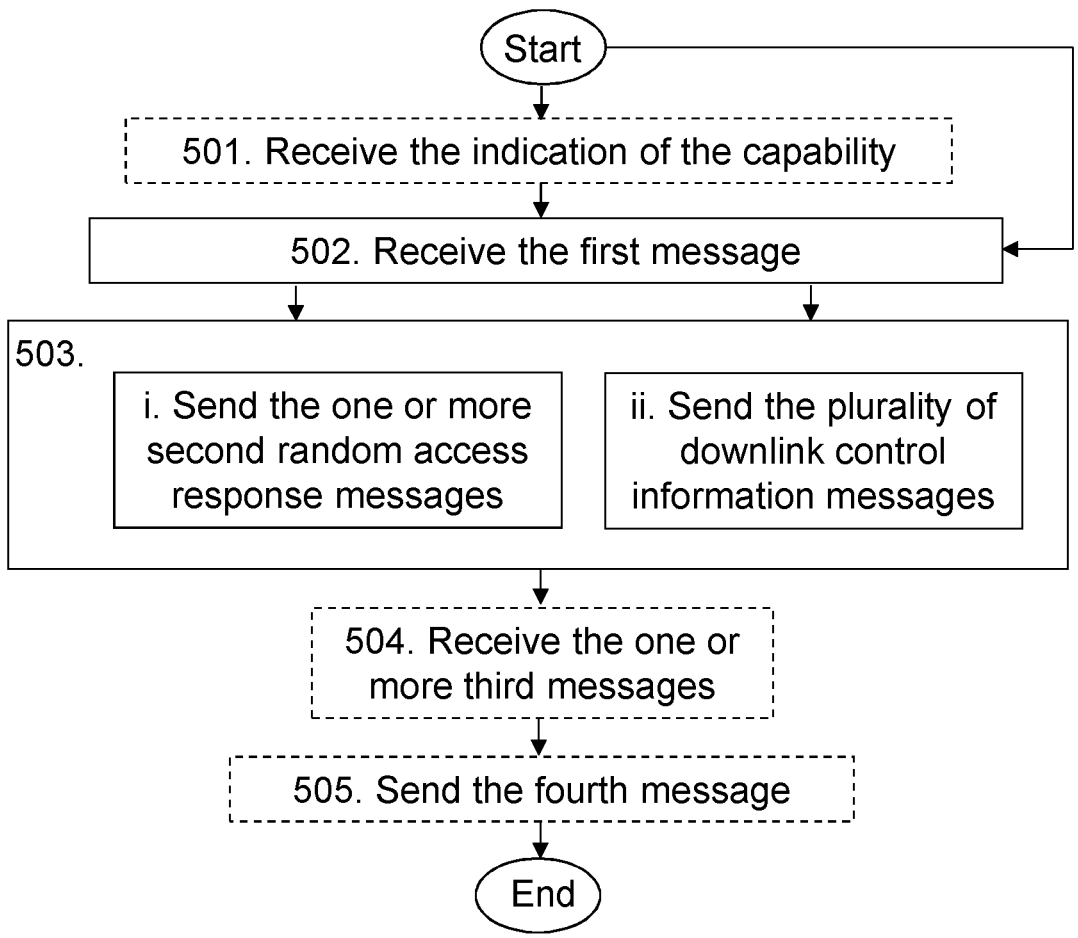
FIG. 5 is a flowchart depicting a method in a network node, according to embodiments herein.

Hence, embodiments herein also relate to the network node 110 comprising the processing circuitry 1104 and the memory 1105, said memory 1105 containing instructions executable by said processing circuitry 1104, whereby the network node 110 is operative to perform the actions described herein in relation to the network node 110, e.g., in FIG. 5, and/or any of FIGS. 6-9.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Examples Related to Embodiments Herein

Examples related to embodiments herein will now be described in reference to FIG. 3, FIG. 4 and FIG. 5.

The wireless device 130 examples relate to FIG. 4, FIGS. 6-10, FIG. 12 and FIGS. 13-18.

An example of a method, performed by a wireless device, such as the wireless device 130 is described herein. The method may be understood to be for handling a random access procedure in a wireless communications network, such as the wireless communications network 100, via a network node, such as the network node 110. The wireless device 130 may be operating in the wireless communications network 100. Particularly, the wireless device 130 may be operating in the wireless communications network 100 in unlicensed spectrum.

The method may comprise one or more of the following actions.

Figure 12:
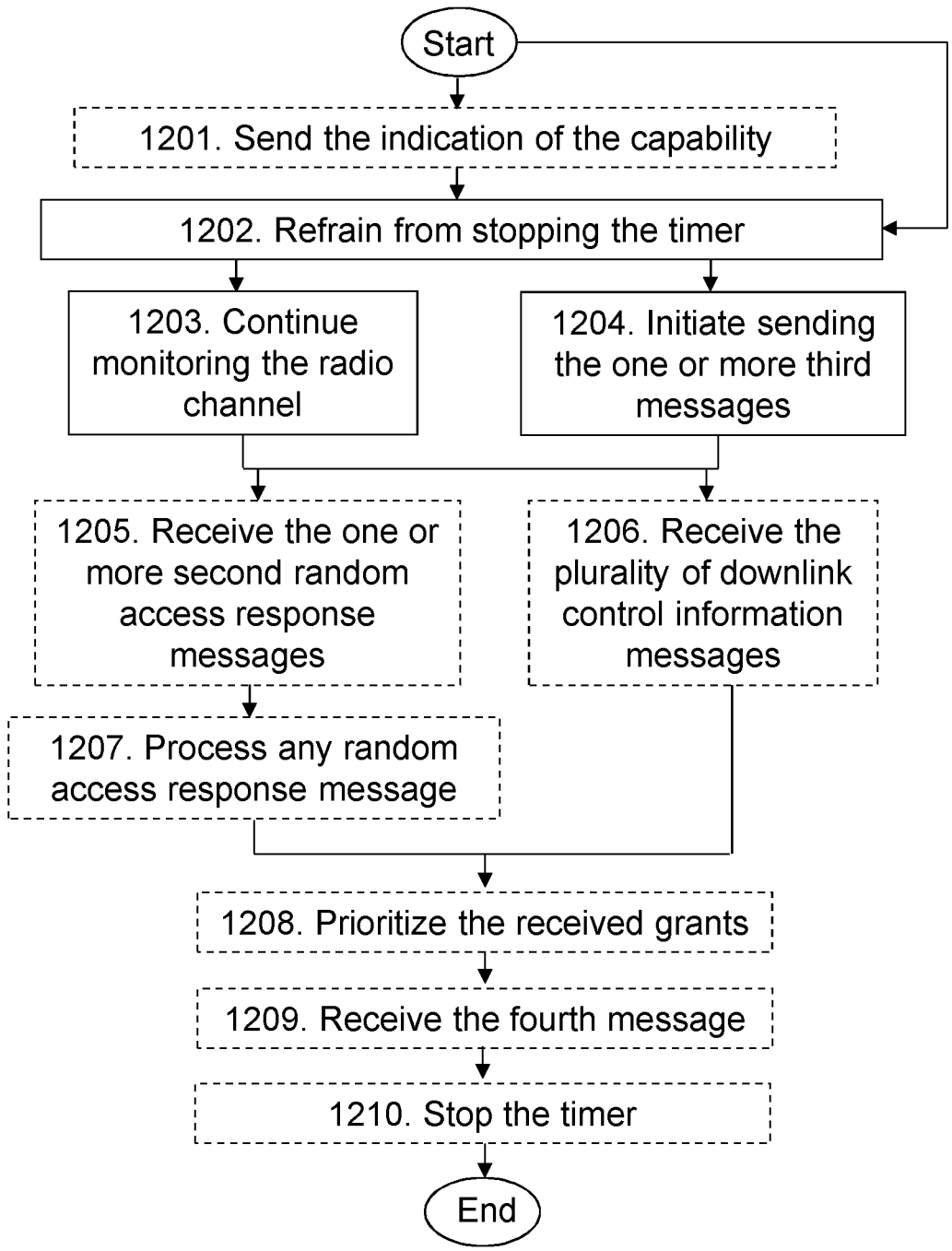
FIG. 12 is a flowchart depicting a method in a wireless device, according to examples related to embodiments herein.

In some examples, all the actions may be performed. One or more examples may be combined, where applicable. All possible combinations are not described to simplify the description. A non-limiting example of the method performed by the wireless device 130 is depicted in FIG. 12.

Refraining 1202 from closing, or stopping, a time window for receiving a random access response message. This may be implemented, for example, by refraining from stopping a timer for a time window for receiving the random access response message.

The wireless device 130 may be configured to perform this refraining action 1202, e.g. by means of the refraining unit 1001 within the wireless device 130, configured to perform this action. The refraining unit 1001 may be a processor 1010 of the wireless device 130, or an application running on such processor.

The refraining in this Action 1202 may be performed, after having sent a first message to the network node 110 requesting random access and having received a first random access response message from the network node 110.

The first message may be, e.g., Msg1 or a message comprising a random access preamble.

The random access response message may be, e.g., Msg2 or RAR.

Continuing monitoring 1203 a radio channel in the unlicensed spectrum for further random access response messages from the network node 110. The wireless device 130 may be configured to perform this providing action 1203, e.g. by means of the monitoring unit 1002, configured to perform this action. The monitoring unit 1002 may be a processor 1010 of the wireless device 130, or an application running on such processor.

The continuing monitoring in this Action 1203 may be performed, e.g., via the first link 141.

The radio channel may be, e.g., the PDCCH.

In some examples, the wireless device 130 may continue monitoring the radio channel addressed to a temporary identifier, e.g., Random Access-Radio Network Temporary identifier (RA-TNTI), for the radio channel addressed to a temporary identifier specifically addressing the wireless device 130, such as e.g., TC-RNTI, or both.

In some examples, the wireless device 130 may continue monitoring for PDCCH addressed to a RA-TNTI, for PDCCH addressed to a temporary cell radio network temporary identifier (TC-RNTI), or for both.

Initiating 1204 sending to the network node 110, simultaneously to the continuing monitoring 1203, and in the unlicensed spectrum, one or more third messages in the random access procedure. The wireless device 130 may be configured to perform this initiating sending action 1204, e.g. by means of the initiating unit 1003, configured to perform this action. The initiating unit 1003 may be a processor 1010 of the wireless device 130, or an application running on such processor.

In some of these examples, the continuing monitoring 1203 of the radio channel may be independent of whether or not the sending of the one or more third messages in the unlicensed spectrum is successful.

The third messages may be, e.g., Msg3 or a message comprising an identifier of the wireless device 130.

Initiating sending in this Action 1204 may be understood as triggering, starting, enabling, sending. The sending may be performed, e.g., via the first link 141.

In some examples, the method may further comprise one or more of the following actions.

In some examples, the first random access response message from the network node 110 may comprise a first grant. In some of these examples, the method may further comprise, while continuing monitoring 1203 the radio channel:

Receiving 1205 one or more second random access response messages from the network node 110. The wireless device 130 may be configured to perform this receiving action 1205, e.g. by means of the receiving unit 1004, configured to perform this action. The receiving unit 1004 may be a processor 1010 of the wireless device 130, or an application running on such processor.

In some of these examples, the one or more second random access response messages from the network node 110 may comprise a respective second grant. The wireless device 130 may, in some of these examples, initiate sending 1204 the one or more third messages according to the received first grant and one or more respective second grants.

In some examples, the first grant and the one or more respective second grants may be one of: the same or different.

In some examples wherein the first random access response message from the network node 110 may comprise the first grant, the method may further comprise, while continuing monitoring 1203 the radio channel:

Receiving 1206 a plurality of downlink control information messages from the network node 110. The wireless device 130 may be configured to perform this receiving action 1206, e.g. by means of the receiving unit 1004, configured to perform this action.

The receiving in this Action 1206 may be performed, e.g., via the first link 141.

In some of these examples, each message in the plurality of downlink control information messages from the network node 110 may comprise a respective third grant. The wireless device 130 may, in some of these examples, initiate sending, in Action 1204, the one or more third messages according to the received respective third grants.

In some examples, each of the respective third grants may be for a respective retransmission of the one or more third messages.

In some examples wherein the first random access response message from the network node 110 may comprise the first grant, the method may further comprise, while continuing monitoring 1203 the radio channel, and after having sent at least one of the one or more third messages:

Receiving 1209, in response to the sent the at least one of the one or more third messages, a fourth message from the network node 110. The wireless device 130 may be configured to perform this receiving action 1209, e.g.

by means of the receiving unit 1004, configured to perform this action.

and

Stopping 410, after receiving the fourth message, the timer for the time window for receiving the random access response message, if a maximum running time of the time window has not expired. The wireless device 130 may be configured to perform this stopping action 410, e.g. by means of the stopping unit 1005, configured to perform this action. The stopping unit 1005 may be a processor 1010 of the wireless device 130, or an application running on such processor.

Stopping the timer may be understood as, e.g., closing, or stopping, the time window.

The receiving in Action 1209 may be performed, e.g., via the first link 141.

The fourth message may be, e.g., Msg4.

In some examples, a first subset of the received third grants may be for a respective retransmission of at least one of the one or more third messages. A second subset of the received third grants may be for at least one initial transmission of the one or more third messages. In some of these examples, the method may further comprise:

Prioritizing 1208 the received grants according to a criterion, or one or more criteria. The wireless device 130 may be configured to perform this prioritizing action 1208, e.g. by means of the prioritizing unit 1006, configured to perform this action. The prioritizing unit 1006 may be a processor 1010 of the wireless device 130, or an application running on such processor.

In some of these examples, the wireless device 130 may then initiate sending 1204 the one or more third messages according to the prioritized grants.

In some examples, the criterion, or the one or more criteria, may be based on one of:

i. an order to trigger transmission, and
ii. a probability of successful Listen-Before-Talk operation.

In some examples, the continuing monitoring in Action 1203 of the radio channel may be performed until a maximum running time of the time window expires. That is, a maximum duration of the timer expires.

In some examples, the method may further comprise one or more of the following actions.

Processing 1207 any random access response message simultaneously received from the network node 110, after sending the first message, during the time window, based on one or more rules. The wireless device 130 may be configured to perform this processing action 1207, e.g. by means of the processing unit 1007, configured to perform this action. The processing unit 1007 may be a processor 1010 of the wireless device 130, or an application running on such processor.

The one or more rules may comprise a rule, such as one of the following rules:

i. always process the random access response message addressed to a Temporary Cell Radio Network Temporary Identifier (TC-RNTI),
ii. process the random access response message addressed to either a TC-RNTI or a Random Access Radio Network Temporary Identifier (RA-RNTI),
iii. process the random access response message addressed to either a TC-RNTI or a Random Access Radio Network Temporary Identifier (RA-RNTI), according to a respective probability of successful transmission in the unlicensed spectrum.

Sending 1201, to the network node 110, an indication of a capability of the wireless device 130. The wireless device 130 may be configured to perform this sending action 1201, e.g. by means of the sending unit 1008, configured to perform this action. The sending unit 1008 may be a processor 1010 of the wireless device 130, or an application running on such processor.

The sending in this Action 1201 may be performed, e.g., via the first link 141.

The capability may be to initiate the sending to the network node 110, according to Action 1204, the one or more third messages in the unlicensed spectrum, simultaneously to the continuing monitoring of Action 1203.

In some examples, to initiate sending, according to Action 1204, of the one or more third messages to the network node 110, simultaneously to the continuing monitoring of Action 1203, and in the unlicensed spectrum, may be configured per one of: service, Logical Channel, LCH, and random access event.

In some examples, the continuing monitoring of Action 1203 of the radio channel may be performed across a plurality of different subbands, channels, bandwidth parts, cells, or carriers.

Other units 1009 may be comprised in the wireless device 130.

The wireless device 130 may also be configured to communicate user data with a host application unit in a host computer 1410, e.g., via another link such as 1460.

Figure 14:
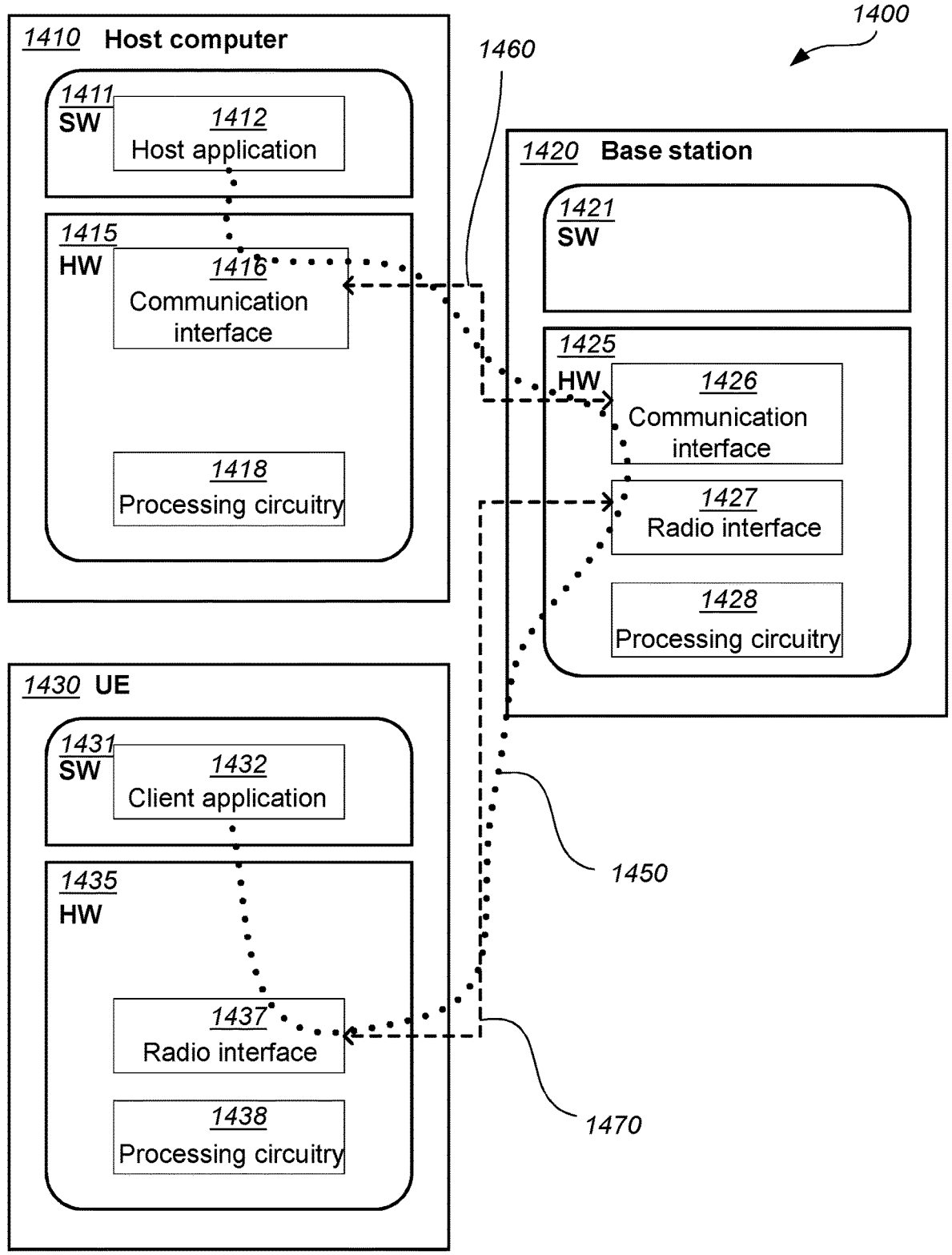
FIG. 14 is a generalized block diagram of a host computer communicating via a base station with a user equipment over a partially wireless connection, according to embodiments herein.

The wireless device 130 may comprise an arrangement as shown in FIG. 10 or in FIG. 14.

The network node 110 examples relate to FIG. 5, FIGS. 6-9, FIG. 11 and FIGS. 13-18.

An example of a method, performed by a network node, such as the network node 110 is described herein. The method may be understood to be for handling a random access procedure by a wireless device, such as the wireless device 130, in a wireless communications network, such as the wireless communications network 100, via a network node, such as the network node 110. The network node 110 may be operating in the wireless communications network 100 in unlicensed spectrum.

The method may comprise one or more of the following actions.

In some examples, all the actions may be performed. One or more examples may be combined, where applicable. All possible combinations are not described to simplify the description. A non-limiting example of the method performed by the network node 110 is depicted in FIG. 5. Some actions may be performed in a different order than that shown in FIG. 5.

Receiving 502, from the wireless device 130, in the unlicensed spectrum, a first message requesting random access. The network node 110 may be configured to perform this receiving action 502, e.g. by means of the receiving unit 1101 within the network node 110, configured to perform this action. The receiving unit 1101 may be a processor 1104 of the network node 110, or an application running on such processor.

The receiving in this Action 502 may be performed, e.g., via the first link 141.

After having sent one or more second random access response messages to the wireless device 130, and in absence of having received a third message in response from the wireless device 130 during at least one time period wherein reception may be expected, the method may comprise the following action:

Sending 503, to the wireless device 130, at least one of:
i. one or more second random access response messages, as long as a time window for sending a random access response message to the wireless device 130 has not expired, and
ii. downlink control information indicating retransmission of the third message.

The network node 110 may be configured to perform this sending action 503, e.g. by means of the sending unit 1102 within the network node 110, configured to perform this action. The sending unit 1102 may be a processor 1104 of the network node 110, or an application running on such processor.

The sending in this Action 503 may be performed, e.g., via the first link 141.

In some examples, the method may further comprise one or more of the following actions.

In some examples, the first random access response message from the network node 110 comprises a first grant. The one or more second random access response messages comprise a respective second grant. In some of these examples, the method may further comprise the following action:

Receiving 504, from the wireless device 130, in the unlicensed spectrum, one or more third messages in the random access procedure. The network node 110 may be configured to perform this receiving action 504, e.g. by means of the receiving unit 1101 within the network node 110, configured to perform this action.

The receiving in this Action 504 may be performed, e.g., via the first link 141.

In some examples, at least one of the one or more third messages may be received according to at least one of: a) the first grant, and b) at least one of the one or more respective second grants.

In some examples, the first grant and the one or more respective second grant may be one of: the same or different.

In some examples, the first random access response message from the network node 110 may comprise a first grant. The downlink control information may comprise a plurality of downlink control information messages to the wireless device 130. Each message in the plurality of downlink control information messages to the wireless device 130 may comprise a respective third grant. In some of these examples, the method may further comprise the following action:

Receiving 504, from the wireless device 130 in the unlicensed spectrum, one or more third messages in the random access procedure. The network node 110 may be configured to perform this receiving action 504, e.g. by means of the receiving unit 1101 within the network node 110, configured to perform this action.

The receiving in this Action 504 may be performed, e.g., via the first link 141.

In some examples, at least one of the one or more third messages may be received according to at least one of: a) the first grant, and b) the plurality of respective third grants.

In some examples, each of the respective third grants may be for a respective retransmission of the one or more third messages.

In some examples wherein the first random access response message comprises a first grant, the method may further comprise, after having received at least one of the one or more third messages, the following action:

Sending 505, in response to the received at least one of the one or more third messages, the fourth message to the wireless device 130. The network node 110 may be configured to perform this sending action 505, e.g. by means of the sending unit 1102 within the network node 110, configured to perform this action.

The sending in this Action 505 may be performed, e.g., via the first link 141.

In some examples, a first subset of the sent third grants may be for a respective retransmission of at least one of the one or more third messages. A second subset of the sent third grants may be for another transmission outside the random access procedure. In some of such examples, the one or more third messages may be received according to the priority.

Receiving 501, from the wireless device 130 the indication of the capability of the wireless device 130 to initiate sending to the network node 110, the one or more third messages in the unlicensed spectrum, simultaneously to continuing monitoring the radio channel in the unlicensed spectrum for further random access response messages from the network node 110. The network node 110 may be configured to perform this receiving action 501, e.g. by means of the receiving unit 1101 within the network node 110, configured to perform this action.

The receiving in this Action 501 may be performed, e.g., via the first link 141.

In some examples, the indication may further indicate that to initiate sending the one or more third messages to the network node 110 in the unlicensed spectrum, simultaneously to continuing monitoring the radio channel in the unlicensed spectrum for further random access response messages from the network node 110, may be configured per one of: service, Logical Channel, LCH, and random access event.

In some examples, the indication may further indicate that the radio channel may be monitored across a plurality of different subbands, channels, bandwidth parts, cells, or carriers.

Other units 1103 may be comprised in the network node 110.

The network node 110 may also be configured to communicate user data with a host application unit in a host computer 1410, e.g., via another link such as 1460.

In FIG. 11, optional units are indicated with dashed boxes.

The network node 110 may comprise an arrangement as shown in FIG. 11 or in FIG. 14.

Below, some selected examples of these examples related to embodiments herein are described.

Example 1. A method performed by a wireless device (130), the method being for handling a random access procedure in a wireless communications network (100) via a network node (110), the wireless device (130) operating in the wireless communications network (100) in unlicensed spectrum, the method comprising:

refraining (402), after having sent a first message to the network node (110) requesting random access and having received a first random access response message from the network node (110), from stopping a timer for a time window for receiving the random access response message, and continuing monitoring (403) a radio channel in the unlicensed spectrum for further random access response messages from the network node (110), and, initiating (404) sending to the network node (110), simultaneously to the continuing monitoring (403), and in the unlicensed spectrum, one or more third messages in the random access procedure, the continuing monitoring (403) of the radio channel being independent of whether or not the sending of the one or more third messages in the unlicensed spectrum is successful.

Example 2. The method according to example 1, wherein the first random access response message from the network node (110) comprises a first grant, and wherein the method further comprises, while continuing monitoring (403) the radio channel:
    receiving (405) one or more second random access response messages from the network node (110), wherein the one or more second random access response messages from the network node (110) comprise a respective second grant, and wherein the wireless device (130) initiates sending (404) the one or more third messages according to the received first grant and one or more respective second grants.

Example 3. The method according to any of example 2, wherein the first grant and the one or more respective second grants are one of: the same or different.

Example 4. The method according to example 1 wherein the first random access response message from the network node (110) comprises a first grant, and wherein the method further comprises, while continuing monitoring (403) the radio channel:
    receiving (406) a plurality of downlink control information messages from the network node (110), wherein each message in the plurality of downlink control information messages from the network node (110) comprises a respective third grant, and wherein the wireless device (130) initiates sending (404) the one or more third messages according to the received respective third grants.

Example 5. The method according to example 4, wherein each of the respective third grants are for a respective retransmission of the one or more third messages.

Example 6. The method according to example 1, wherein the first random access response message from the network node (110) comprises a first grant, and wherein the method further comprises, while continuing monitoring (403) the radio channel, and after having sent at least one of the one or more third messages:
    receiving (409), in response to the sent the at least one of the one or more third messages, a fourth message from the network node (110) and
    stopping (410), after receiving the fourth message, the timer for the time window for receiving the random access response message, if a maximum running time of the time window has not expired.

Example 7. The method according to example 4, wherein a first subset of the received third grants is for a respective retransmission of at least one of the one or more third messages, and a second subset of the received third grants is for at least one initial transmission of the one or more third messages, and wherein the method further comprises:
    prioritizing (408) the received grants according to a criterion, and wherein the wireless device (130) initiates sending (404) the one or more third messages according to the prioritized grants.

Example 8. The method according to example 7, wherein the criterion is based on one of:
    i. an order to trigger transmission, and
    ii. a probability of successful Listen-Before-Talk operation.

Example 9. The method according to any of examples 1-8, wherein the continuing monitoring (403) of the radio channel until a maximum running time of the time window expires.

Example 10. The method according to any of examples 1-9, further comprising:
    processing (407) any random access response message simultaneously received from the network node (110), after sending the first message, during the time window, based on one of the following rules:
        i. always process the random access response message addressed to a Temporary Cell Radio Network Temporary Identifier, TC-RNTI,
        ii. process the random access response message addressed to either a TC-RNTI or a Random Access Radio Network Temporary Identifier, RA-RNTI,
        iii. process the random access response message addressed to either a TC-RNTI or a Random Access Radio Network Temporary Identifier, RA-RNTI, according to a respective probability of successful transmission in the unlicensed spectrum.

Example 11. The method according to any of examples 1-10, further comprising:
    sending (401), to the network node (110) an indication of a capability of the wireless device (130) to initiate (404) sending to the network node (110), the one or more third messages in the unlicensed spectrum, simultaneously to the continuing monitoring (403).

Example 12. The method according to any of examples 1-11, wherein to initiate (404) sending the one or more third messages to the network node (110), simultaneously to the continuing monitoring (403), and in the unlicensed spectrum, is configured per one of: service, Logical Channel, LCH, and random access event.

Example 13. The method according to any of examples 1-12, wherein the continuing monitoring (403) of the radio channel is performed across a plurality of different subbands, channels, bandwidth parts, cells, or carriers.

Example 14. A method performed by a network node (110), the method being for handling a random access procedure by a wireless device (130) in a wireless communications network (100) via the network node (110), the network node (110) operating in the wireless communications network (100) in unlicensed spectrum, the method comprising:
    receiving (502) from the wireless device (130), in the unlicensed spectrum, a first message requesting random access, and
    after having sent one or more second random access response messages to the wireless device (130), and in absence of having received a third message in response from the wireless device (130) during at least one time period wherein reception is expected, sending (503), to the wireless device (130), at least one of:
        i. one or more second random access response messages, as long as a time window for sending a random access response message to the wireless device (130) has not expired, and
        ii. downlink control information indicating retransmission of the third message.

Example 15. The method according to example 14, wherein the first random access response message from the network node (110) comprises a first grant, wherein the one or more second random access response messages comprise a respective second grant, and wherein the method further comprises:
    receiving (504), from the wireless device (130), in the unlicensed spectrum, one or more third messages in the random access procedure, wherein at least one of the one or more third messages is received according to at least one of: a) the first grant, and b) at least one of the one or more respective second grants.

Example 16. The method according to any of example 15, wherein the first grant and the one or more respective second grant are one of: the same or different.

Example 17. The method according to example 14 wherein the first random access response message from the network node (110) comprises a first grant, and wherein the downlink control information comprises a plurality of downlink control information messages to the wireless device (130), wherein each message in the plurality of downlink control information messages to the wireless device (130) comprises a respective third grant, and wherein the method further comprises:
- receiving (504), from the wireless device (130) in the unlicensed spectrum, one or more third messages in the random access procedure, wherein at least one of the one or more third messages is received according to at least one of: a) the first grant, and b) the plurality of respective third grants.

Example 18. The method according to example 17, wherein each of the respective third grants is for a respective retransmission of the one or more third messages.

Example 19. The method according to example 14, wherein the first random access response message comprises a first grant, and wherein the method further comprises, after having received at least one of the one or more third messages:
- sending (505), in response to the received at least one of the one or more third messages, a fourth message to the wireless device (130).

Example 20. The method according to example 17, wherein a first subset of the sent third grants is for a respective retransmission of at least one of the one or more third messages, and a second subset of the sent third grants is for another transmission outside the random access procedure, and wherein the one or more third messages are received according to a priority.

Example 21. The method according to any of examples 14-20, further comprising:
- receiving (501), from the wireless device (130) an indication of a capability of the wireless device (130) to initiate sending to the network node (110), the one or more third messages in the unlicensed spectrum, simultaneously to continuing monitoring a radio channel in the unlicensed spectrum for further random access response messages from the network node (110).

Example 22. The method according to example 21, wherein the indication further indicates that to initiate sending the one or more third messages to the network node (110) in the unlicensed spectrum, simultaneously to continuing monitoring the radio channel in the unlicensed spectrum for further random access response messages from the network node (110), is configured per one of: service, Logical Channel, LCH, and random access event.

Example 23. The method according to any of examples 21-23, wherein the indication further indicates that the radio channel is monitored across a plurality of different subbands, channels, bandwidth parts, cells, or carriers.

Further Extensions and Variations

Figure 13:
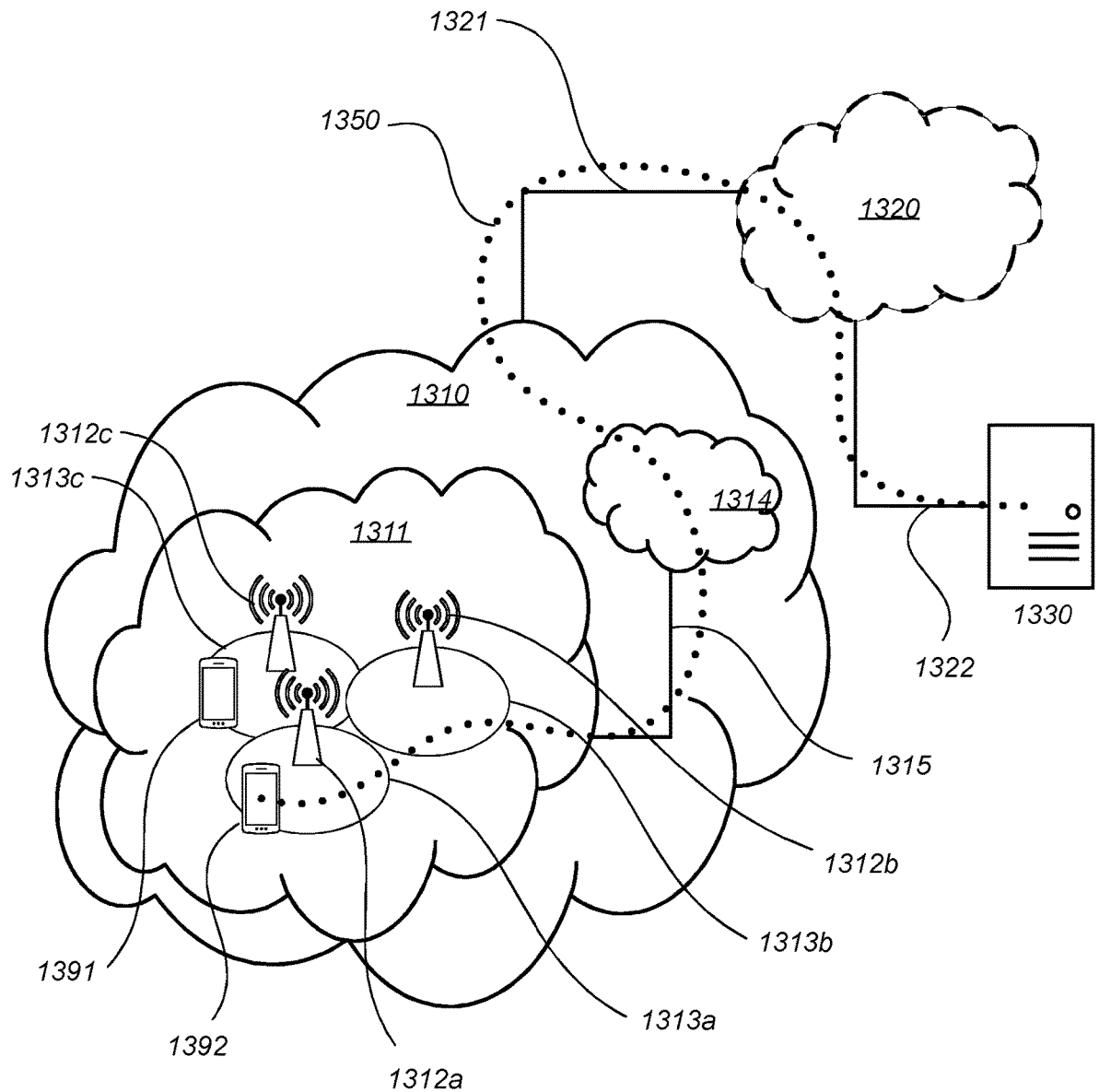
FIG. 13 is a schematic block diagram illustrating a telecommunication network connected via an intermediate network to a host computer, according to embodiments herein.

FIG. 13: Telecommunication Network Connected Via an Intermediate Network to a Host Computer in Accordance with Some Embodiments With reference to FIG. 13, in accordance with an embodiment, a communication system includes telecommunication network 1310 such as the wireless communications network 100, for example, a 3GPP-type cellular network, which comprises access network 1311, such as a radio access network, and core network 1314. Access network 1311 comprises a plurality of network nodes such as the network node 110. For example, base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to core network 1314 over a wired or wireless connection 1315. A plurality of wireless devices, such as the wireless device 130 are comprised in the wireless communications network 100. In FIG. 13, a first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312. Any of the UEs 1391, 1392 are examples of the wireless device 130.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signalling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

In relation to FIGS. 14, 15, 16, 17, and 18, which are described next, it may be understood that a UE is an example of the wireless device 130, and that any description provided for the UE equally applies to the wireless device 130. It may be also understood that the base station is an example of the network node 110, and that any description provided for the base station equally applies to the network node 110.

FIG. 14: Host Computer Communicating Via a Base Station with a User Equipment over a Partially Wireless Connection in Accordance with Some Embodiments Example implementations, in accordance with an embodiment, of the wireless device 130, e.g., a UE, the network node 110, e.g., a base station and host computer discussed in the preceding paragraphs will now be described with reference to FIG. 14. In communication system 1400, such as the wireless communications network 100, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes the network node 110, exemplified in FIG. 14 as a base station 1420 provided in a telecommunication system and comprising hardware 1425 enabling it to communicate with host computer 1410 and with UE 1430.

Hardware 1425 may include communication interface 1426 for setting up and maintaining a wired or wireless connection with an interface of a different communication device of communication system 1400, as well as radio interface 1427 for setting up and maintaining at least wireless connection 1470 with the wireless device 130, exemplified in FIG. 14 as a UE 1430 located in a coverage area (not shown in FIG. 14) served by base station 1420.

Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 14 may be similar or identical to host computer 1330, one of base stations 1312a, 1312b, 1312c and one of UEs 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signalling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

The wireless device 130 embodiments relate to FIG. 4, FIGS. 6-10, and FIGS. 13-18.

The wireless device 130 may also be configured to communicate user data with a host application unit in a host computer 1410, e.g., via another link such as 1460.

The wireless device 130 may comprise an interface unit to facilitate communications between the wireless device 130 and other nodes or devices, e.g., the network node 110, the host computer 1410, or any of the other nodes. In some particular examples, the interface may, for example, include a transceiver configured to transmit and receive radio signals over an air interface in accordance with a suitable standard.

The wireless device 130 may comprise an arrangement as shown in FIG. 10 or in FIG. 14.

The network node 110 embodiments relate to FIG. 5, FIGS. 6-9, FIG. 11 and FIGS. 13-18.

The network node 110 may also be configured to communicate user data with a host application unit in a host computer 1410, e.g., via another link such as 1460.

The network node 110 may comprise an interface unit to facilitate communications between the network node 110 and other nodes or devices, e.g., the wireless device 130, the host computer 1110, or any of the other nodes. In some particular examples, the interface may, for example, include a transceiver configured to transmit and receive radio signals over an air interface in accordance with a suitable standard.

The network node 110 may comprise an arrangement as shown in FIG. 11 or in FIG. 14.

FIG. 15: Methods Implemented in a Communication System Including a Host Computer, a Base Station and a User Equipment in Accordance with Some Embodiments FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

FIG. 16: Methods Implemented in a Communication System Including a Host Computer, a Base Station and a User Equipment in Accordance with Some Embodiments FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

FIG. 17: Methods Implemented in a Communication System Including a Host Computer, a Base Station and a User Equipment in Accordance with Some Embodiments FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

FIG. 18: Methods Implemented in a Communication System Including a Host Computer, a Base Station and a User Equipment in Accordance with Some Embodiments FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A base station configured to communicate with a user equipment (UE), the base station comprising a radio interface and processing circuitry configured to perform one or more of the actions described herein as performed by the network node 110.

5. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform one or more of the actions described herein as performed by the network node 110.

6. The communication system of embodiment 5, further including the base station.

7. The communication system of embodiment 6, further including the UE, wherein the UE is configured to communicate with the base station.

8. The communication system of embodiment 7, wherein:
   the processing circuitry of the host computer is configured to execute a host application, thereby providing the user data; and
   the UE comprises processing circuitry configured to execute a client application associated with the host application.

11. A method implemented in a base station, comprising one or more of the actions described herein as performed by the network node 110.

15. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs one or more of the actions described herein as performed by the network node 110.

16. The method of embodiment 15, further comprising:
   at the base station, transmitting the user data.

17. The method of embodiment 16, wherein the user data is provided at the host computer by executing a host application, the method further comprising:
   at the UE, executing a client application associated with the host application.

21. A user equipment (UE) configured to communicate with a base station, the UE comprising a radio interface and processing circuitry configured to perform one or more of the actions described herein as performed by the wireless device 130.

25. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's processing circuitry configured to perform one or more of the actions described herein as performed by the wireless device 130.

26. The communication system of embodiment 25, further including the UE.

27. The communication system of embodiment 26, wherein the cellular network further includes a base station configured to communicate with the UE.

28. The communication system of embodiment 26 or 27, wherein:
   the processing circuitry of the host computer is configured to execute a host application, thereby providing the user data; and
   the UE's processing circuitry is configured to execute a client application associated with the host application.

31. A method implemented in a user equipment (UE), comprising one or more of the actions described herein as performed by the wireless device 130.

35. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs one or more of the actions described herein as performed by the wireless device 130.

36. The method of embodiment 35, further comprising:
   at the UE, receiving the user data from the base station.

41. A user equipment (UE) configured to communicate with a base station, the UE comprising a radio interface and processing circuitry configured to perform one or more of the actions described herein as performed by the wireless device 130.

45. A communication system including a host computer comprising:
   a communication interface configured to receive user data originating from a transmission from a user equipment (UE) to a base station,
   wherein the UE comprises a radio interface and processing circuitry, the UE's processing circuitry configured to: perform one or more of the actions described herein as performed by the wireless device 130.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
   the processing circuitry of the host computer is configured to execute a host application; and
   the UE's processing circuitry is configured to execute a client application associated with the host application, thereby providing the user data.

49. The communication system of embodiment 46 or 47, wherein:
 the processing circuitry of the host computer is configured to execute a host application, thereby providing request data; and
 the UE's processing circuitry is configured to execute a client application associated with the host application, thereby providing the user data in response to the request data.

51. A method implemented in a user equipment (UE), comprising one or more of the actions described herein as performed by the wireless device 130.

52. The method of embodiment 51, further comprising:
 providing user data; and
 forwarding the user data to a host computer via the transmission to the base station.

55. A method implemented in a communication system including a host computer, a base station and a user equipment (UE), the method comprising:
 at the host computer, receiving user data transmitted to the base station from the UE, wherein the UE performs one or more of the actions described herein as performed by the wireless device 130.

56. The method of embodiment 55, further comprising:
 at the UE, providing the user data to the base station.

57. The method of embodiment 56, further comprising:
 at the UE, executing a client application, thereby providing the user data to be transmitted; and
 at the host computer, executing a host application associated with the client application.

58. The method of embodiment 56, further comprising:
 at the UE, executing a client application; and
 at the UE, receiving input data to the client application, the input data being provided at the host computer by executing a host application associated with the client application,
 wherein the user data to be transmitted is provided by the client application in response to the input data.

61. A base station configured to communicate with a user equipment (UE), the base station comprising a radio interface and processing circuitry configured to perform one or more of the actions described herein as performed by the network node 110.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the network node 110.

66. The communication system of embodiment 65, further including the base station.

67. The communication system of embodiment 66, further including the UE, wherein the UE is configured to communicate with the base station.

68. The communication system of embodiment 67, wherein:
 the processing circuitry of the host computer is configured to execute a host application;
 the UE is configured to execute a client application associated with the host application, thereby providing the user data to be received by the host computer.

71. A method implemented in a base station, comprising one or more of the actions described herein as performed by the network node 110.

75. A method implemented in a communication system including a host computer, a base station and a user equipment (UE), the method comprising:
 at the host computer, receiving, from the base station, user data originating from a transmission which the base station has received from the UE, wherein the UE performs one or more of the actions described herein as performed by the wireless device 130.

76. The method of embodiment 75, further comprising:
 at the base station, receiving the user data from the UE.

77. The method of embodiment 76, further comprising:
 at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
5G 5th Generation system for mobile communication
5GC 5th Generation Core Network
5GS 5th Generation System
5QI 5th Generation Quality of Service Identifier
AMF Access and Mobility Management Function
ARP Admission and Retention Policy
CIoT Critical Internet of Things
CN Core Network
CSG Closed Subscriber Group
DM DISPLAY MEMORY
DM Domain Manager
DU Distributed Unit
eNB evolved Node B
en-gNB gNB acting as secondary node in EN-DC
EPC Evolved Packet Core
EPS Evolved Packet System
GBR Guaranteed Bitrate
gNB NR radio node
ID Identify/Identifier
IE Information Element
LTE Long Term Evolution
MO Managed Object
NE Network Element
NG Next Generation
NGAP NG application protocol
ng-eNB eNB connected to 5th generation core network
NG-RAN NG radio access network
NM Network Management
NR Radio interface used in NG-RAN
ONAP Open Network Automation Platform
OSS Operations Support Systems
PLMN Public Land Mobile Network
QCI Quality of Service Class Identifier
RAN Radio Access Network
RAT Radio Access Technology
RCF Radio Control Function
RFSP Radio Access Technology/Frequency Selection Priority
RN Radio Node
RRC Radio Resource Control
S1 Interface between eNB and MME and between eNB and S-GW
S1AP S1 Application Protocol
SMS Short Message Service
SPID Subscriber Profile Identifier TS Technical Specification
UE User Equipment
UPF User Plane Function

REFERENCES 1. 3GPP TR 38.889 ""Study on NR-based access to unlicensed spectrum, Release 16", v 16.0.0
2. 3GPP TS 38.321, V15.4.0.
3. 3GPP TS 38.213, V15.4.0.

The invention claimed is:

1. A method performed by a wireless device, the method being for handling a random access procedure in a wireless communications network via a network node, the wireless device operating in the wireless communications network, the method comprising:
sending, to the network node, an indication of a capability of the wireless device to continuously monitor, after having received a first random access response message from the network node, simultaneously: a) a radio channel, for further random access response messages from the network node, addressed to a first temporary identifier, and b) the radio channel, addressed to a second temporary identifier specifically addressing the wireless device;
refraining, after having sent a first message to the network node requesting a random access and having received the first random access response message from the network node, from stopping a timer for a time window for receiving the first random access response message; and
continuing monitoring both: a) the radio channel for the further random access response messages from the network node addressed to the first temporary identifier, and b) the radio channel, addressed to the second temporary identifier specifically addressing the wireless device.

2. The method according to claim 1, wherein the first temporary identifier to which the further random access response messages are addressed is a Random Access Radio Network Temporary Identifier, RA-RNTI, and wherein the second temporary identifier specifically addressing the wireless device is one of a Temporary Cell Radio Network Temporary Identifier, TC-RNTI, and a Cell Radio Network Temporary Identifier, C-RNTI.

3. A wireless device, for handling a random access procedure in a wireless communications network via a network node, the wireless device being configured to operate in the wireless communications network, the wireless device being further configured to:
send, to the network node, an indication of a capability of the wireless device to continuously monitor, after having received a first random access response message from the network node, simultaneously: a) a radio channel, for further random access response messages from the network node, addressed to a first temporary identifier, and b) the radio channel, addressed to a second temporary identifier specifically addressing the wireless device;
refrain, after having sent a first message to the network node configured to request a random access and having received the first random access response message from the network node, from stopping a timer for a time window for receiving the first random access response message; and
continue monitoring both: a) the radio channel for the further random access response messages from the network node addressed to the first temporary identifier, and b) the radio channel, addressed to the second temporary identifier configured to specifically address the wireless device.

4. The wireless device according to claim 3, wherein the first temporary identifier to which the further random access response messages are configured to be addressed is configured to be a Random Access Radio Network Temporary Identifier, RA-RNTI, and wherein the second temporary identifier configured to specifically address the wireless device is configured to be one of a Temporary Cell Radio Network Temporary Identifier, TC-RNTI, and a Cell Radio Network Temporary Identifier, C-RNTI.

5. The wireless device according to claim 3, being further configured to:
initiate sending to the network node, simultaneously to the continuing monitoring, one or more third messages in the random access procedure, the continuing monitoring of the radio channel being configured to be independent of whether or not the sending of the one or more third messages is successful.

6. The wireless device according to claim 5, wherein the first random access response message from the network node is configured to include a first grant, and wherein the wireless device is further configured to, while continuing to monitor the radio channel:
receive one or more second random access response messages from the network node, wherein the one or more second random access response messages from the network node are configured to include a respective second grant, and wherein the wireless device is further configured to initiate sending the one or more third messages according to the first grant and one or more respective second grants.

7. The wireless device according to claim 5, wherein the first random access response message from the network node is configured to include a first grant, and wherein the wireless device is further configured to, while continuing to monitor the radio channel:
receive a plurality of downlink control information messages from the network node, wherein each message in the plurality of downlink control information messages from the network node is configured to include a respective third grant, and wherein the wireless device is configured to initiate sending the one or more third messages according to the respective third grants.

8. The wireless device according to claim 7, wherein the wireless device is further configured to, while continuing to monitor the radio channel, receive one or more second random access response messages from the network node, the one or more second random access response messages from the network node being configured to include a respective second grant, wherein the respective third grants are configured to be for a respective retransmission of at least one of the one or more third messages, and the respective second grants are configured to be for at least one initial transmission of the one or more third messages, and wherein the wireless device is further configured to:
prioritize the second and third grants according to a criterion, and to initiate sending the one or more third messages according to the prioritized grants.

9. The wireless device according to claim 5, wherein the first random access response message from the network node is configured to include a first grant, and wherein the wireless device is further configured to, while continuing to monitor the radio channel, and after having sent at least one of the one or more third messages:

receive, in response to the sent at least one of the one or more third messages, a fourth message from the network node; and stop, after receiving the fourth message, the timer for the time window for receiving the first random access response message if a maximum running time of the time window has not expired.

10. The wireless device according to claim 9, wherein the radio channel configured to be monitored is a Physical Downlink Control Channel, PDCCH, and wherein a reception of the PDCCH associated with the fourth message is configured to be addressed to a Cell Radio Network Temporary Identifier, C-RNTI, or a Temporary Cell Radio Network Temporary Identifier, TC-RNTI.

11. The wireless device according to claim 3, wherein the wireless device is configured for the continuing monitoring of the radio channel until a maximum running time of the time window expires.

12. The wireless device according to claim 3, being further configured to:
process any Physical Downlink Control Channel, PDCCH, message simultaneously received from the network node, after sending the first message to the network node, during the time window, based on one of the following rules:
  i. always process a PDCCH transmission configured to be addressed to a Temporary Cell Radio Network Temporary Identifier, TC-RNTI;
  ii. process the PDCCH transmission configured to be addressed to one of the TC-RNTI and a Random Access Radio Network Temporary Identifier, RA-RNTI;
  iii. process the PDCCH transmission configured to be addressed to one of the TC-RNTI and the according to a respective probability of successful transmission.

13. A network node, for handling a random access procedure by a wireless device in a wireless communications network via the network node, the network node being configured to operate in the wireless communications network, the network node being further configured to:
receive, from the wireless device, an indication of a capability of the wireless device to continuously monitor, after having received a first random access response message from the network node, simultaneously: a) a radio channel for further random access response messages from the network node addressed to a first temporary identifier, and b) the radio channel, addressed to a second temporary identifier configured to specifically address the wireless device;

receive from the wireless device, a first message requesting a random access; and after having sent one or more random access response messages to the wireless device, and in absence of having received a third message in response from the wireless device during at least one time period wherein reception is configured to be expected, send, to the wireless device, at least one of:
  i. one or more second random access response messages, as long as a time window for sending a random access response message to the wireless device has not expired; and
  ii. downlink control information indicating a retransmission of the third message.

14. The network node according to claim 13, wherein the one or more second random access response messages are configured to be sent in the radio channel and addressed to the first temporary identifier, and wherein the downlink control information is configured to be sent in the radio channel and to be addressed to second temporary identifier specifically addressing the wireless device.

15. The network node according to claim 14, wherein the first temporary identifier to which the one or more second random access response messages are configured to be addressed is configured to be a Random Access Radio Network Temporary Identifier, RA-RNTI, and wherein the second temporary identifier specifically addressing the wireless device is configured to be one of a Temporary Cell Radio Network Temporary Identifier, TC-RNTI, and a Cell Radio Network Temporary Identifier, C-RNTI.

16. The network node according to claim 13, wherein the first random access response message from the network node is configured to include a first grant, wherein the one or more second random access response messages are configured to include a respective second grant, and wherein the network node is further configured to:
receive, from the wireless device, one or more third messages in the random access procedure, wherein at least one of the one or more third messages is to be received according to at least one of: a) the first grant, and b) at least one of the one or more respective second grants.

17. The network node according to claim 16, wherein the network node is further configured to, after having received at least one of the one or more third messages:
send, in response to the received at least one of the one or more third messages, a fourth message to the wireless device.

18. The network node according to claim 17, wherein the radio channel is configured to be a Physical Downlink Control Channel, PDCCH, and wherein a PDCCH transmission associated with the fourth message is configured to be addressed to one of a Cell Radio Network Temporary Identifier, C-RNTI, and a Temporary Cell Radio Network Temporary Identifier, TC-RNTI.

19. The network node according to claim 13, wherein the first random access response message from the network node is configured to include a first grant a first grant, wherein the downlink control information is configured to include a plurality of downlink control information messages to the wireless device, wherein each message in the plurality of downlink control information messages to the wireless device is configured to include a respective third grant, and wherein the network node is further configured to:
receive, from the wireless device, one or more third messages in the random access procedure, wherein at least one of the one or more third messages is to be received according to at least one of: a) the first grant, and b) the plurality of respective third grants.

* * * * *